(12) United States Patent
Evangelista et al.

(10) Patent No.: US 11,069,094 B1
(45) Date of Patent: Jul. 20, 2021

(54) GENERATING REALISTIC MAKEUP IN A DIGITAL VIDEO STREAM

(71) Applicant: Facebook, Inc., Menlo Park, CA (US)

(72) Inventors: Bruno Pereira Evangelista, Palo Alto, CA (US); Houman Meshkin, El Cerrito, CA (US); Ben Max Rubinstein, San Francisco, CA (US); Helen Haekwang Kim, San Francisco, CA (US); Anaelisa Aburto, San Francisco, CA (US); David Michael Garrison Hill, San Francisco, CA (US); Chayan Goswami, Mountain View, CA (US); Sung Kyu Robin Kim, South Pasadena, CA (US); Ian Heisters, San Francisco, CA (US); Catherine Yoo, San Francisco, CA (US); Ernest Rowe, San Mateo, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 16/410,785

(22) Filed: May 13, 2019

(51) Int. Cl.
| | |
|---|---|
| *G06T 11/00* | (2006.01) |
| *A45D 44/00* | (2006.01) |
| *H04N 5/265* | (2006.01) |
| *G06T 11/40* | (2006.01) |
| *H04N 5/272* | (2006.01) |

(52) U.S. Cl.
CPC .......... *G06T 11/001* (2013.01); *A45D 44/005* (2013.01); *G06T 11/40* (2013.01); *H04N 5/265* (2013.01); *H04N 2005/2726* (2013.01)

(58) Field of Classification Search
None
See application file for complete search history.

(56) References Cited

U.S. PATENT DOCUMENTS

| | | | |
|---|---|---|---|
| 2016/0042556 A1* | 2/2016 | Imber | G06T 7/90 |
| | | | 345/426 |
| 2018/0189978 A1* | 7/2018 | Dong | G06T 5/008 |
| 2019/0014884 A1* | 1/2019 | Fu | G06K 9/00671 |
| 2019/0230295 A1* | 7/2019 | Pincenti | H04N 5/2258 |
| 2020/0020149 A1* | 1/2020 | Moltaji | G06T 7/90 |
| 2020/0098098 A1* | 3/2020 | Zhang | G06K 9/2054 |

OTHER PUBLICATIONS

Artsiom Ablavatski and Ivan Grishchenko, "Google AI Blog_ Real-Time AR Self-Expression with Machine Learning", Mar. 8, 2019, Google AI (Year: 2019).*

* cited by examiner

*Primary Examiner* — YuJang Tswei
(74) *Attorney, Agent, or Firm* — Keller Jolley Preece

(57) ABSTRACT

Methods, systems, and non-transitory computer readable storage media are disclosed for rendering makeup products on a user's face within an augmented reality environment in real-time. For example, the disclosed system can use blend a base makeup color of a selected makeup product with extracted luminance frequencies of a video stream. The disclosed system can then convert the blended makeup color to LAB color space and apply one or more shader models to the lightness of the color based on a material of the selected makeup product. The disclosed system can also apply additional operations for smoothing the skin of the user and matching the makeup product to a skin tone of the user. The disclosed system can then display the makeup product and any additional changes in an augmented reality environment in the video stream.

20 Claims, 19 Drawing Sheets

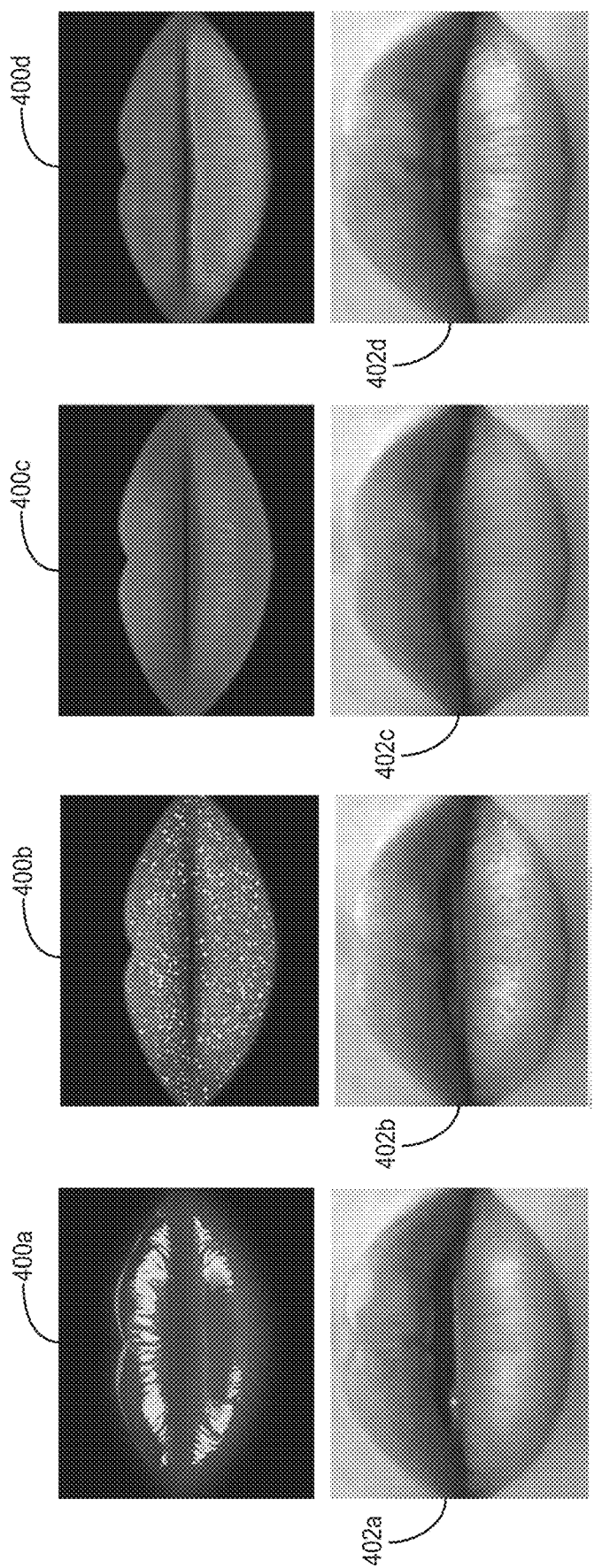
*FIG. 4A* *FIG. 4B* *FIG. 4C* *FIG. 4D*

GENERATING REALISTIC MAKEUP IN A DIGITAL VIDEO STREAM

BACKGROUND

Augmented reality (AR) has become increasingly prevalent as computer processing and digital imaging capabilities have improved. Indeed, smartphones and other handheld devices now have AR capabilities that allow users to view and capture images or video of real-world scenes and render digital layers over the images/video in real-time. AR-enabled devices thus allow users to view and/or capture scenes with objects, characters, textures, etc. digitally added to the scenes.

Because AR environments digitally add layers to digital images or videos, making the added layers match the look and feel of the images/video is important to the realism of the AR scene. Lighting, textures, and other visual characteristics of AR layers play a large role in making the details of the AR layers blend in with the real-world images/videos. Specifically, if the visual characteristics of the AR layers do not blend in with the real-world background, the AR scene will appear fake or otherwise unnatural.

Furthermore, some uses of AR require accurate visual characteristics of AR components. For instance, when using AR devices to test makeup, accurate blending of AR layers onto real-world images/videos is critical to the function of the AR layers. In particular, different light sources, skin tones, and makeup materials can result in wildly varying look in real-world environments. Without accurate blending, the color of a specific makeup product may be highly inaccurate, such that users will be unable to accurately see how a specific makeup product would look.

Conventional AR systems that apply makeup (or other facial accessories) in an AR environment typically display a makeup product on a user's face by applying a selected color directly to a makeup layer in the AR environment in an HSV or LAB color space. Even with AR lighting effects, however, the conventional AR systems generally produce inaccurate appearance of AR makeup/materials relative to the real-world environment due to varied lighting conditions, user skin tones, and/or makeup/materials. Accordingly, there are a number of disadvantages with conventional AR systems.

SUMMARY

One or more embodiments provide benefits and/or solve one or more of the foregoing or other problems in the art with systems, methods, and non-transitory computer readable storage media that generate augmented reality makeup with realistic color and lighting. More particularly, in response to receiving a makeup selection to apply to a user's face in a digital video stream, the disclosed systems extract luminance frequencies (low-range and mid-range frequencies) from the digital video stream and blend the color of the makeup selection with the extracted luminance frequencies. The disclosed systems then convert the blended color to the LAB space and modify the lightness of the blended color by applying one or more shading models to the blended color based on the material (e.g., gloss, glitter, matte, metallic) of the makeup selection. Once the material of the makeup selection is applied to the lightness of the blended color, the disclosed systems convert the blended color (with the modified lightness) back to the RGB color space for applying to the digital video stream.

Additionally, in one or more embodiments, the disclosed systems apply localized tone mapping to the digital video stream. Specifically, the disclosed systems downsample the digital video stream and compute luma values (e.g., average luma and luma range) of each of a plurality of sections of the digital video stream. The disclosed systems then modify the luma of the different sections based on a predetermined luma threshold by remapping the color of each pixel to an s-curve generated from the computed luma values. The disclosed systems can also share the downsampled digital video stream processing with processes for smoothing the skin on the user's face by using a guided filter that leverages a luma-based guiding image. The disclosed systems thus accurately and efficiently reproduce makeup colors based on the user's skin tones and real-world lighting while also efficiently using computing resources.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIGS. 4A-4D illustrate example images of makeup materials and corresponding rendering results in accordance with one or more implementations;

DETAILED DESCRIPTION

Figure 1:
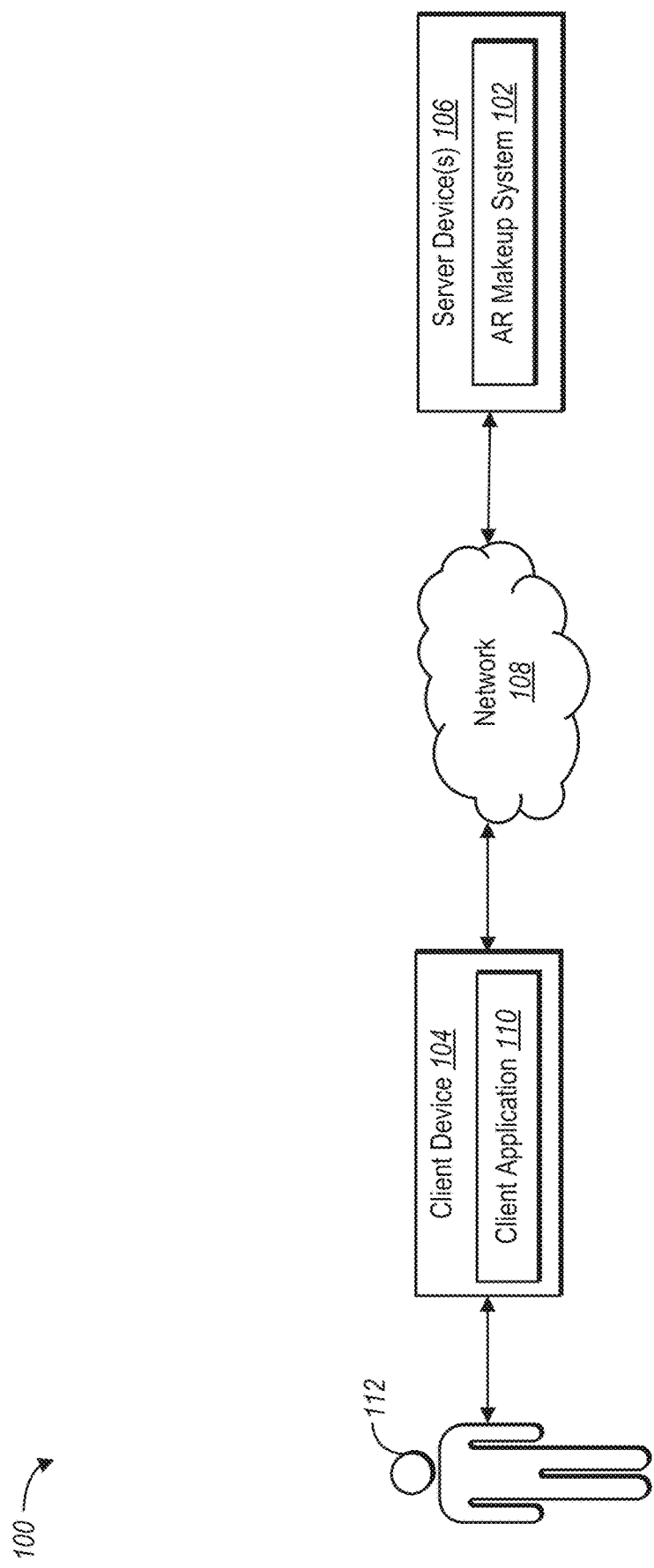
FIG. 1 illustrates an example environment in which an augmented reality makeup system can operate in accordance with one or more implementations.

One or more embodiments of the present disclosure include an augmented reality makeup system (also "AR makeup system") that applies realistic makeup to a user's face in an augmented reality environment. Specifically, in one or more embodiments, the AR makeup system uses a face tracker to apply makeup products to a face-aligned mesh for each frame of a live digital video stream. In one or more embodiments, the AR makeup system utilizes luminance frequency information of a digital video stream to modify a makeup color to apply to a user's face in an augmented reality environment. The AR makeup system can further modify the lightness of the makeup color by applying makeup shader model(s) corresponding to the makeup material(s) and environment reflection in the LAB color space. Additionally, the AR makeup system can adjust the makeup color or other facial features in the augmented reality layer by using localized tone mapping to make the makeup look natural and a guided filter to smooth the skin tone of the user's face.

In one or more additional embodiments, the AR makeup system allows a user to test the appearance of certain facial/makeup accessories with realistic lighting effects. Specifically, the AR makeup system can generate an accessory mesh to add to the face-aligned mesh of the user's face. The AR makeup system then can add an accessory to the accessory mesh so that the AR makeup system can efficiently and accurately recreate the accessory in the augmented reality environment. Additionally, the AR makeup system can animate the accessories within the augmented reality environment by generating an animation armature for the accessory mesh and then posing the animation armature in response to movement of a corresponding area of the user's face. Thus, the AR makeup system can recreate makeup and accessories within an augmented reality environment with a realistic appearance and movement based on a user's tones, the lighting in the environment, and movement of the user's face within a digital video stream.

As mentioned above, in one or more embodiments, the AR makeup system incorporates luminance frequency information into color of a selected makeup product that a user has selected to apply to an area of an identified face within a digital video stream. In one or more embodiments, the AR makeup system extracts a first set of frequencies (e.g., mid-range luminance frequencies) and a second set of frequencies (e.g., low-range luminance frequencies) from the desaturated digital video stream. The AR makeup system can blend the albedo color (base color in the red-green-blue ("RGB") color space) of the selected makeup product with the first set of frequencies by screening the albedo color with the first set of frequencies. In such embodiments, the AR makeup system then blends the first blending output with the second set of frequencies by multiplying the first blending output with the second set of frequencies. In at least some embodiments, the AR makeup system also combines the blended makeup color with a pre-computed ambient occlusion map that simulates shading of the makeup area in response to ambient lighting.

Once the makeup color is blended with the luminance frequencies, the AR makeup system can further adjust the makeup color based on the material of the selected makeup product. In particular, the AR makeup system can convert the blended makeup color from the original color space (e.g., RGB color space) to the LAB color space (also sometimes referred to as the CIE L*a*b* color space). The AR makeup system can then apply one or more shader models based on the material of the selected makeup product in the LAB color space by modifying the lightness of the makeup color based on the shader model(s). Accordingly, the AR makeup system can apply realistic materials for a selected makeup product to an augmented reality layer in a live digital video stream.

As mentioned, the AR makeup system can modify aspects of the digital video stream within the augmented reality environment. Specifically, the AR makeup system can apply skin smoothing to an identified face by first detecting the edges of the face. The AR makeup system can then generate a guiding image based on a luma of the face in the digital video stream. In one or more embodiments, the AR makeup system uses a fast guided filter to smooth the skin of the area within the detected edges of the face based on the luma-based guiding image, which packages RGB colors and luma within a single texture.

The AR makeup system can also apply localized tone mapping to the digital video stream to further improve the realism of the makeup color in the augmented reality environment. For example, the AR makeup system can downsample the digital video stream (e.g., individual image frames of the video stream) and divide the downsampled digital video stream into a plurality of separate sections (e.g., a 4×8 grid). For each section, the AR makeup system can determine the average luma and luma ranges (minimum and maximum luma). The AR makeup system can then remap the colors of each pixel in the augmented reality layer to an s-curve based on the calculated luma values. The AR makeup system can thus render makeup colors to blend into the real-world environment based on the real skin/facial tones of an identified face.

In addition to allowing users to apply makeup products to their skin in an augmented reality environment, the AR makeup system can allow users to view additional makeup accessories within the augmented reality environment. In particular, in response to a selection to add a makeup accessory (e.g., eyelashes), the AR makeup system can generate an accessory mesh to add to a face-aligned mesh in a digital video stream. The AR makeup system can apply skin smoothing and/or tone mapping to the makeup accessories to blend in with the real-world environment. The AR makeup system can also generate an animation armature (e.g., movable joints) that causes the accessory mesh to move in connection with movement of the corresponding area of the user's face. Accordingly, the AR makeup system can animate the accessories using the animation armature to adjust the size, shape, and location of the accessory mesh with the movement of the identified face.

As mentioned, the AR makeup system provides a number of advantages over conventional systems. For example, the AR makeup system improves the accuracy of computing systems that present digitally rendered makeup in an augmented reality environment. In particular, as discussed above, the AR makeup system can blend a base color of a makeup selection with a plurality of sets of luminance frequencies in an RGB color space and then apply shading in a LAB color space. By applying the base color in the RGB color space and the shading in the LAB color space, the AR makeup system provides more accurate and consistent colors over diverse skin tones and lighting conditions. In contrast, as mentioned, conventional systems apply a makeup base color in the HSV or LAB color space, resulting in inconsistent colors across varying skin tones or environment lighting conditions.

Furthermore, the AR makeup system improves the processing efficiency of computing systems that present digitally rendered makeup in an augmented reality environment. Specifically, the AR makeup system utilizes a downsampling process for applying skin smoothing and localized tone mapping to a digital video stream. By sharing the downsampled calculations across the skin smoothing and localized tone mapping operations, the AR makeup system saves processing time when rendering makeup in an augmented reality environment. Additionally, the AR makeup system can reduce the number of rendering passes when rendering the augmented reality environment by packaging the RGB colors and alpha (luminance) together, thereby further reducing processing loads.

Additional detail will now be provided regarding the AR makeup system in relation to illustrative figures portraying exemplary implementations. To illustrate, FIG. 1 includes an embodiment of an exemplary environment 100 in which an AR makeup system 102 can operate. In particular, the environment 100 includes a client device 104 and server device(s) 106 in communication via a network 108. The client device 104 includes a client application 110. Additionally, the client device 104 is associated with a user 112.

In one or more embodiments, the client device 104 includes a computing device that allows the user 112 to capture digital video streams via the client application 110. For instance, the client device 104 can include a mobile device (e.g., a smartphone), a laptop computing device, a desktop computing device, or other computing device capable of capturing live video input. The client application 110 can include any application for capturing live video input and utilizing augmented reality operations including a makeup application, a camera application, or a messaging application.

As used herein, the term "digital video stream" (or simply "video stream") refers to digital video captured using an image capture device. For example, a digital video stream can include live video of a user at a computing device (e.g., a smartphone, a laptop, a desktop with a digital camera) from one or more cameras (e.g., a front-facing camera for taking "selfies"). Furthermore, as used herein, the term "digital image frame" refers to an individual image frame of the digital video stream. A digital video stream includes a number of image frames per second of video based on a frame capture rate of the image capture device. Specifically, the user 112 can utilize the client application 110 to capture a live video stream of the user 112 or of another user.

The AR makeup system 102 can provide augmented reality operations that allow the user 112 to view makeup products within an augmented reality environment. Specifically, the user 112 can use the client application 110 on the client device 104 to apply digitally rendered makeup on a live digital video stream. For example, the user 112 can select a makeup product from a plurality of makeup products to apply to a specific part of the user's face within the client application 110. As used herein, the term "makeup selection" refers to a selected makeup product to apply to a face within an augmented reality environment. For instance, a makeup product can include lipstick, lip gloss, face powder, mascara, foundation, primer, eyeliner, concealer, highlighter, rouge, eye shadow, face paint, or other cosmetics applied to the face to enhance or otherwise alter an appearance of the user's face. Additionally, a makeup selection can implicitly indicate an area of the user's face to apply a makeup product (e.g., a lipstick selection implicitly indicates an application to the user's lips). Also as used herein, the term "material" refers to a texture characteristic of a makeup product that determines achromatic effects of the makeup. For example, materials can include, but are not limited to, glossy, glitter, matte, or metallic makeup materials. Furthermore, achromatic effects include reflectivity, transparency, or roughness (e.g., surface relief) of a makeup product.

To apply a makeup selection within an augmented reality environment, the AR makeup system 102 can track a face within a live digital video stream and generate an augmented reality layer including digitally rendered makeup that tracks with the identified face within the digital video stream. The AR makeup system 102 can apply digitally rendered makeup by first identifying a face using face-tracking software and generating a three-dimensional mesh representing the identified face. The AR makeup system 102 can then generate a texture representing the selected makeup product and apply the texture to a portion of the mesh corresponding to the area of the user's face that the user indicates. Thus, when the user selects the makeup product, the AR makeup system 102 can automatically display the makeup on the user's face within the video stream so that the user can see how the makeup product looks on the user's face. As described in more detail below, the AR makeup system 102 can analyze the digital video stream to modify a selected color and/or other properties of the makeup selection so that the digitally rendered makeup looks natural on the user's face within the digital video stream.

Additionally, the AR makeup system 102 can allow the user 112 to include digitally rendered accessories in the augmented reality environment. As used herein, the term "accessory selection" refers to a selection of a makeup accessory to apply to a face within an augmented reality environment. For example, an accessory can include false eyelashes, piercings, or other makeup accessories that can be attached to a user's face. The AR makeup system 102 can render an accessory in an augmented reality environment by adding an accessory mesh to a face-tracking mesh. Furthermore, the AR makeup system 102 can animate a digitally rendered accessory in connection with movements of the user 112 in the digital video stream by generating posable armatures for an accessory mesh.

Although the environment of FIG. 1 is depicted as having various components, the environment 100 may have any number of additional or alternative components (e.g., any number of server devices, client devices, or other components in communication with the AR makeup system 102). For example, the AR makeup system 102 can allow any number of users associated with any number of client devices to digitally render makeup within augmented reality environments on digital video streams. Furthermore, the AR makeup system 102 can communicate with (or include) any number of systems or databases to access makeup products to digitally render in augmented reality environments. Additionally, more than one component or entity in the environment 100 can implement the operations of the AR makeup system 102 described herein.

For example, as illustrated in FIG. 1, at least a portion of the AR makeup system 102 is implemented on the server device(s) 106. In one or more embodiments, the AR makeup system 102 includes a makeup product database that includes makeup product data for use in digitally rendering a plurality of makeup products in augmented reality environments. For example, the AR makeup system 102 can provide a plurality of possible makeup products for a user to view on the client device 104 (e.g. within the client application 110). In response to a selection of a makeup product, or in connection with previewing the makeup product on the client device 104, the client device can perform one or more operations associated with rendering the makeup product in an augmented reality environment (e.g., rendering augmented reality layers on top of the video stream). In at least some implementations, the server device(s) 106 receive the video stream from the client device 104, render augmented reality layers on the video stream, and send the augmented video stream back to the client device 104. In one or more alternative embodiments, the AR makeup system 102 is implemented entirely on the client device 104, such that the client device 104 can perform the augmented reality processes described herein without communicating with any other devices (e.g., the server device(s) 106).

Figure 2:
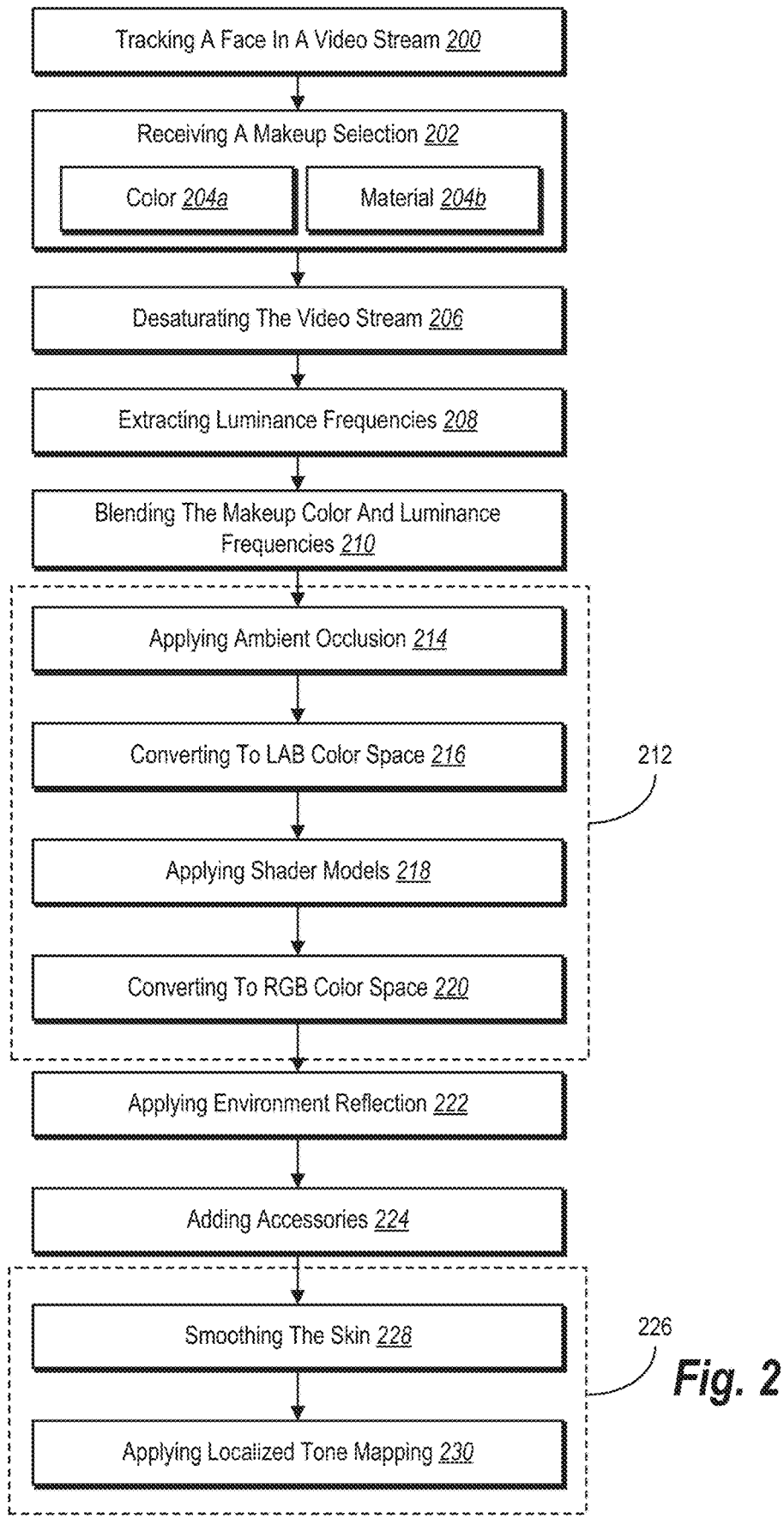
FIG. 2 illustrates a flowchart diagram of a process for digitally rendering makeup and accessories to a digital video stream in accordance with one or more embodiments.

As mentioned above, the AR makeup system 102 can render realistic makeup in an augmented reality environment by analyzing a digital video stream and a makeup selection. FIG. 2 illustrates a broad overview of an embodiment of a process of applying a makeup selection to an area of an identified face in an augmented reality environment for a digital video stream. In particular, the process includes a series of acts in which the AR makeup system 102 modifies a base color of a makeup selection by performing different operations within the RGB color space and the LAB color space.

In one or more embodiments, the series of acts includes an act 200 of tracking a face in a video stream. Specifically, the AR makeup system 102 can utilize face tracking to identify faces within digital images/videos. For example, the AR makeup system 102 tracks a user's face within a field of view of an image capture device based on identifying facial features (e.g., eyes, nose, mouth), face edges, etc. The AR makeup system 102 can thus track the movement of the user's face during a live video stream, as well as the movement and location of different regions of the face. Furthermore, tracking the movement of the user's face can also include generating a three-dimensional mesh that tracks with the user's face. As used herein, the term "three-dimensional mesh" refers to a structural model including a plurality of polygons to represent an object. For instance, as described herein, a three-dimensional mesh can include a face-tracking mesh representing a user's face or an accessory mesh representing a makeup accessory.

After, before, or otherwise in connection with identifying a face in a video stream, the series of acts can include an act 202 of receiving a makeup selection. In one or more embodiments, receiving a makeup selection includes determining that a user selects a makeup product to apply to a specific region of the user's face via a computing device that captures the video stream. To illustrate, the AR makeup system 102 can determine that a user has selected a lipstick product to apply to the user's face. The makeup selection also includes a color 204*a* and a material 204*b* that corresponds to the makeup product.

After receiving a makeup selection to apply to a portion of the user's face in the video stream, the AR makeup system 102 applies the makeup selection within an augmented reality environment for the video stream in real-time. As the computing device captures individual image frames for the video stream, the AR makeup system 102 analyzes image frames of the video stream, modifies the color 204*a* of the makeup selection based on the image frames, and applies the makeup selection to one or more augmented reality layers for the image frames. Accordingly, the AR makeup system 102 applies a digitally rendered makeup product in an augmented reality environment for each individual image frame of the video stream.

In one or more embodiments, to apply the makeup selection to the video stream, the series of acts includes an act 206 of desaturating the video stream. Specifically, the AR makeup system 102 can desaturate the video stream by desaturating an image frame of the video stream. For example, the AR makeup system 102 identifies an image frame of the video stream, such as a most recently captured image frame in the video stream. In another example, the AR makeup system 102 identifies an image frame from a queue of image frames (e.g., a video buffer). The AR makeup system 102 desaturates the image frame to obtain a grayscale version of the image frame.

The series of acts can then include an act 208 of extracting luminance frequencies. In particular, the AR makeup system 102 extracts luminance frequencies from the image frame by determining a plurality of frequency ranges of the image frame. The sets of frequencies indicate different brightness levels of the desaturated image frame. To illustrate, the AR makeup system 102 determines a first set of mid-range luminance frequencies and a second set of low-range luminance frequencies from the desaturated image frame corresponding to mid brightness portions of the desaturated image frame and low brightness portions of the desaturated image frame, respectively.

As described in more detail below, the AR makeup system 102 can then extract the sets of luminance frequencies for use in highlighting different lighting portions of the makeup color based on the image frame. The series of acts includes an act 210 of blending the makeup color and luminance frequencies. Specifically, the AR makeup system 102 can first blend the makeup color with the mid-range frequencies by screening the mid-range frequencies on top of the makeup color, which highlights the makeup color corresponding to brighter portions of the image frame. The AR makeup system 102 can then blend the screen result with the low-range frequencies by multiplying the low-range frequencies on top of the makeup color, which further highlights the brighter portions while maintaining the darker portions of the image frame at approximately similar brightness levels.

After blending the makeup color with the luminance frequencies of the desaturated image frame, the series of acts can optionally include acts 212 to further modify the makeup color by providing shading to the makeup. In particular, modifying the makeup color can include an act 214 of applying ambient occlusion to the makeup color. For example, the AR makeup system 102 can generate an ambient occlusion map based on the area of the image frame corresponding to the makeup selection. The ambient occlusion map creates shadowing for the augmented reality layer to give the makeup color a texture that mimics the shading of the face area to which the AR makeup system 102 is applying the makeup. For instance, an ambient occlusion map for applying digitally rendered lipstick in the video stream can include a geometry of the user's lips (e.g., from the previously generated face-tracking mesh of the user's face). The AR makeup system 102 can then blend the pre-computed ambient occlusion map with the makeup color.

Once the AR makeup system 102 applies the ambient occlusion to the makeup color, the AR makeup system 102 can then apply the makeup materials to the makeup color. The acts 212 further include an act 216 of converting the makeup color with ambient occlusion to the LAB color space. In one or more embodiments, the AR makeup system 102 converts the result of combining the makeup color and the occlusion map from the color space of the makeup selection (e.g., the RGB color space) to the LAB color space. Converting the makeup color to the LAB color space allow the AR makeup system 102 to modify lightness values of the pixels in the makeup color without changing the color components.

To apply the material 204b of the makeup selection to the rendered makeup in the augmented reality layer, the acts 212 can include an act 218 of applying shader models to the makeup color in the LAB color space. In particular, the AR makeup system 102 can utilize a plurality of pre-generated shader models to model shading of different makeup material and surfaces. For instance, the AR makeup system 102 can use a gloss shader model and a shine shader model to represent different makeup materials such as glitter, gloss, matte, or metallic. Accordingly, the AR makeup system 102 can apply the shader models in different ways to modify the lightness of the makeup color and achieve the appearance of the different makeup materials. The AR makeup system 102 can thus apply the material 204b of the makeup selection by using a predetermined combination of the gloss shader model and the shine shader model. After the AR makeup system 102 applies the shader models to the makeup color, the acts 212 can include an act 220 of converting the makeup color back to the RGB color space.

In addition to applying shader models that apply a material of a makeup selection to the makeup color, the acts 212 for applying lighting effects to the makeup can also include an act 222 of applying environment reflection to the makeup. Specifically, the AR makeup system 102 can use an environment map to simulate reflections over very bright makeup areas. The AR makeup system 120 can generate the environment map to include a virtual low-frequency studio light setup that is oriented in three dimensions according to the client device of the user, thus creating realistic reflections that move based on movement of the client device and/or the user's face within the video stream. Additionally, the makeup material further affects the reflections from the environment map based on the amount of gloss and shine of the applied shader models.

In one or more embodiments, the series of acts also includes an act 224 of adding accessories to the augmented reality environment. For instance, the AR makeup system 102 can allow a user to select accessories to add to one or more regions of the user's face within the video stream. Based on a selected accessory, the AR makeup system 102 generates an accessory mesh to add to the face-tracking mesh and then textures the accessory mesh based on the selected accessory. To illustrate, the AR makeup system 102 can add eyelashes, piercings, or other accessories to a user's face in a video stream by adding a textured accessory mesh to the face-tracking mesh. Furthermore, the AR makeup system 102 can apply various lighting effects to the accessory using one or more of the processes described above with respect to the makeup selection.

Additionally, the AR makeup system 102 can animate an accessory mesh so that the accessory follows user movements in the video stream. Specifically, the AR makeup system 102 can attach the accessory mesh to the face-tracking mesh using joints so that the accessory mesh also tracks with movement of the user's face. The joints also allow the AR makeup system 102 to animate the accessory by deforming the accessory mesh based on changes in the shape or other movements of the corresponding region of the user's face. Thus, for instance, the AR makeup system 102 can animate an eyelash accessory by moving the accessory mesh to follow blinking movements or other movements by the user's eyelids in the video stream.

According to one or more embodiments, the series of acts optionally includes acts 226 for applying full-screen post processing operations to the video stream. For example, the acts 226 include an act 228 for smoothing the skin of the user, by utilizing an edge-preserving blur filter to even out the natural skin tones of the user in the video stream. In particular, the AR makeup system 102 can first identify the edges of the user's face in the image frame using an edge detection algorithm. Based on the identified edges, the AR makeup system 102 can generate a luma-based guiding image as an input to a filter that smooths the user's skin. In one or more embodiments, the filter includes a fast guided filter, though the AR makeup system 102 can use one or more other filters to perform the skin smoothing processes.

Furthermore, the acts 226 can include an act 230 of applying localized tone mapping to the user's face in the video stream. Specifically, the AR makeup system 102 can generate a downsampled image frame and divide the downsampled image frame into a plurality of sections. The AR makeup system 102 can calculate luma values for the plurality of sections and then modify the colors in the different sections by remapping the colors to an s-curve based on the calculated luma values. The tone mapping operations map the colors of the makeup and accessories to the lighting/colors in the real-world environment to provide added realism for the augmented reality environment. Localizing the tone mapping using the plurality of sections in this way allows the AR makeup system 102 to provide more accurate tone mapping across the entire image frame.

Figure 3A:
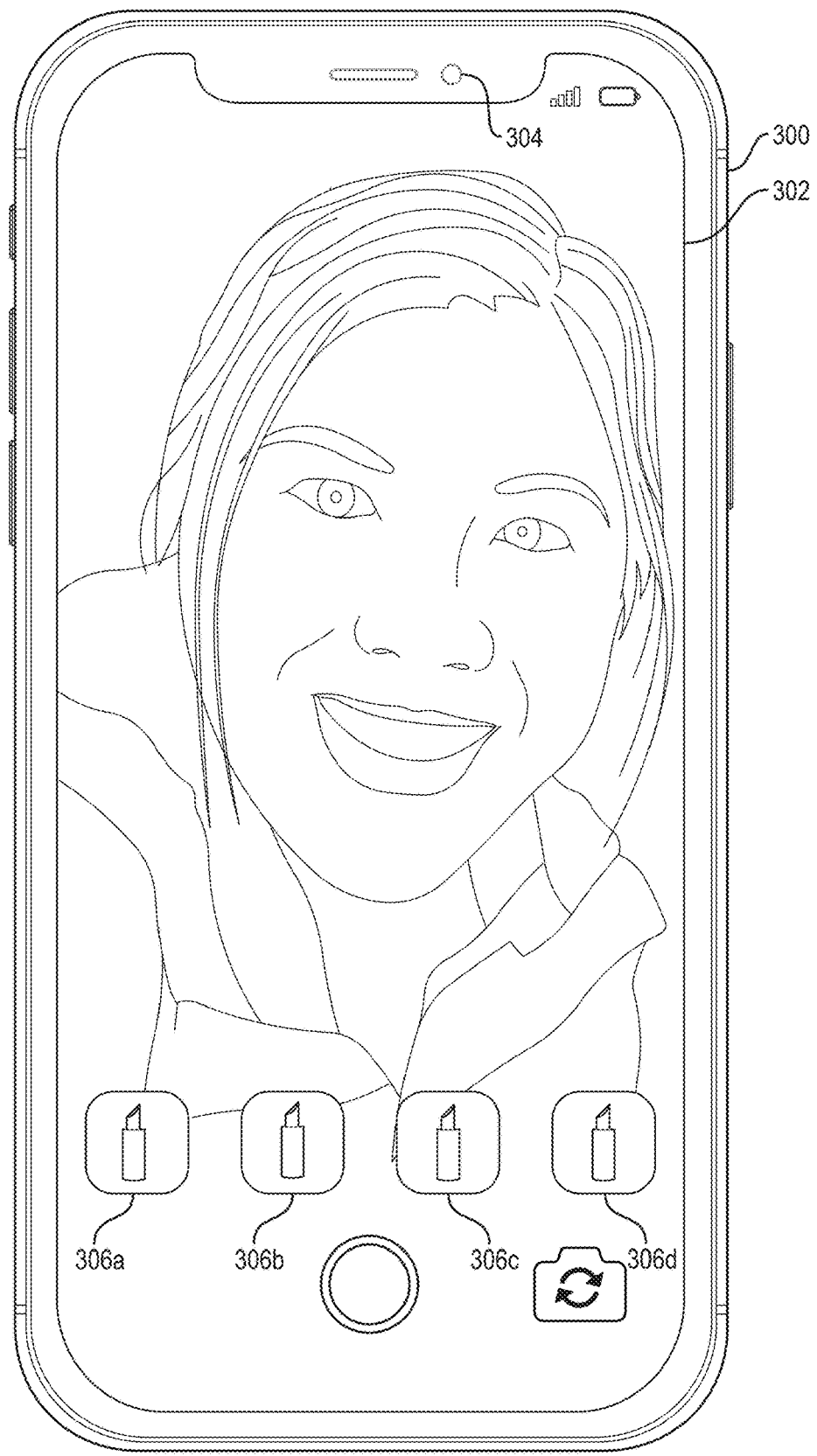
FIGS. 3A-3I illustrate user interfaces and three-dimensional meshes in a process for applying makeup in an augmented reality environment in accordance with one or more implementations.
Figure 3B:
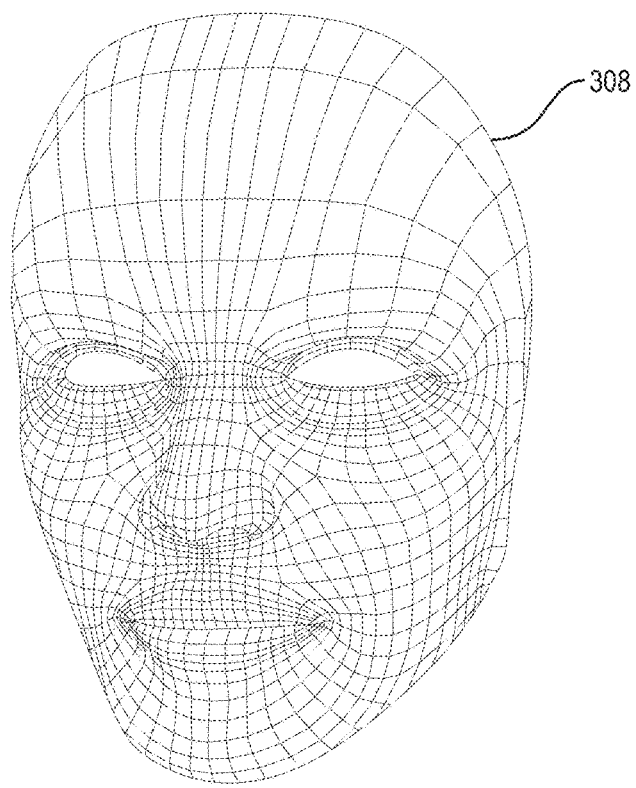
Figure 3C:
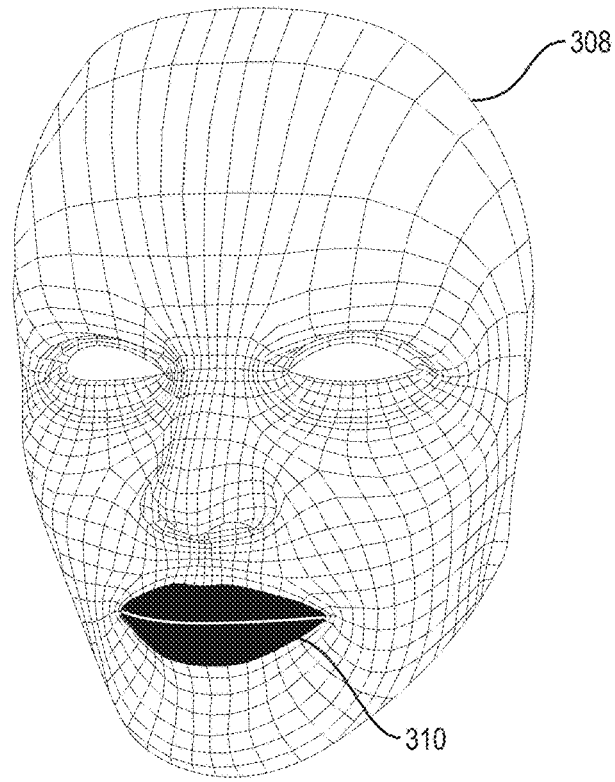
Figure 3D:
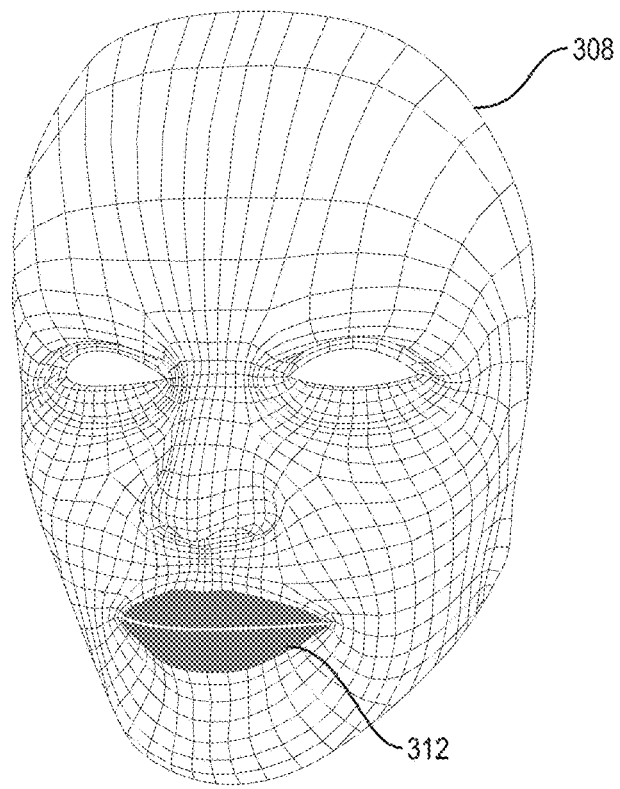
Figure 3E:
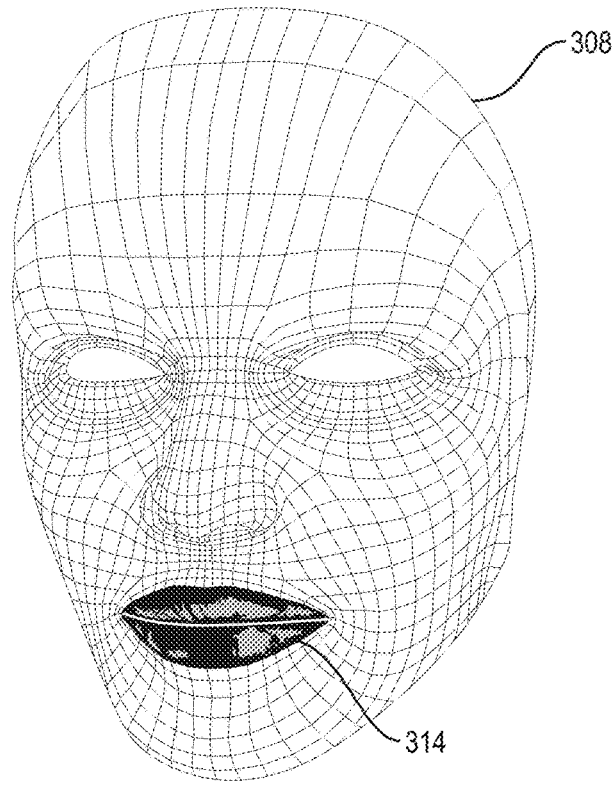
Figure 3F:
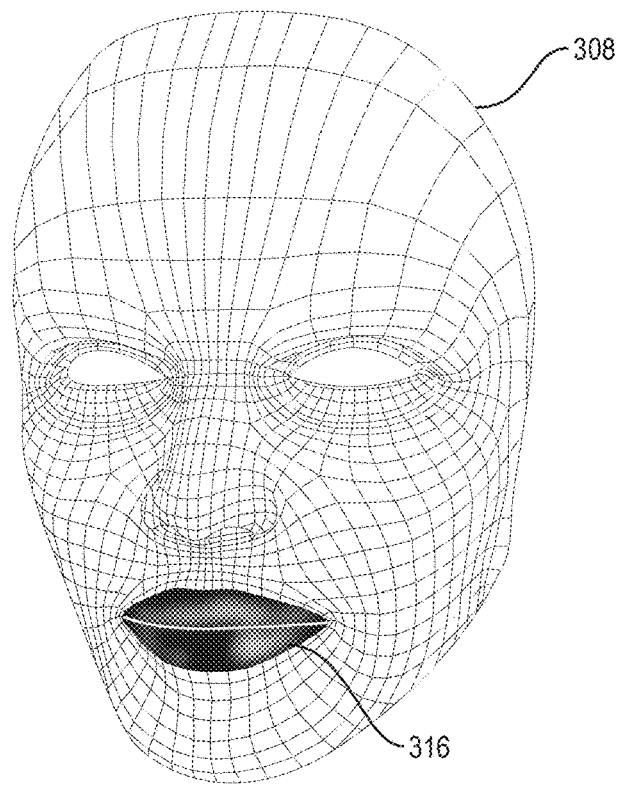
Figure 3G:
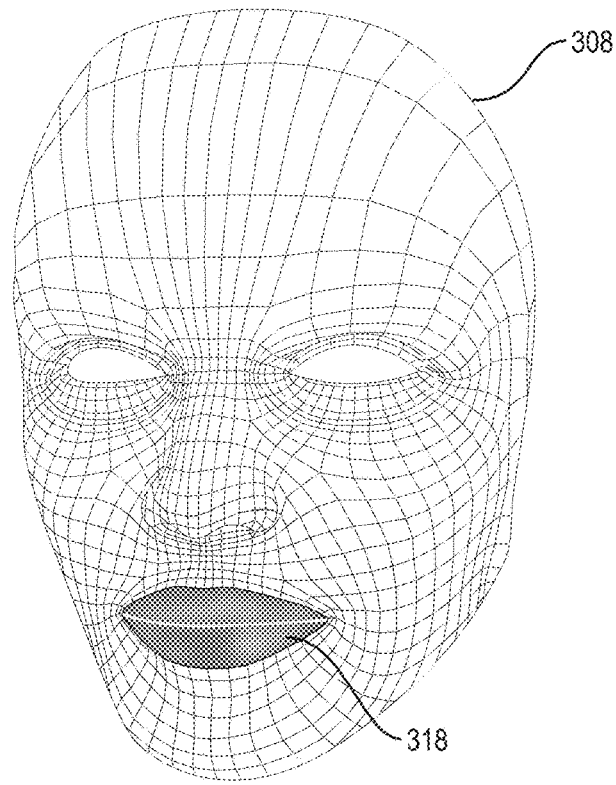
Figure 3H:
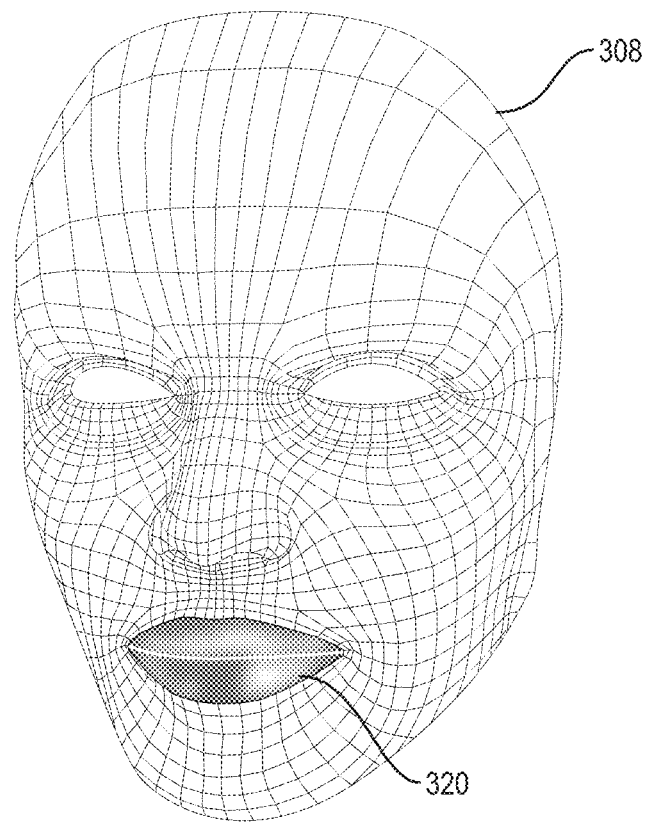
Figure 3I:
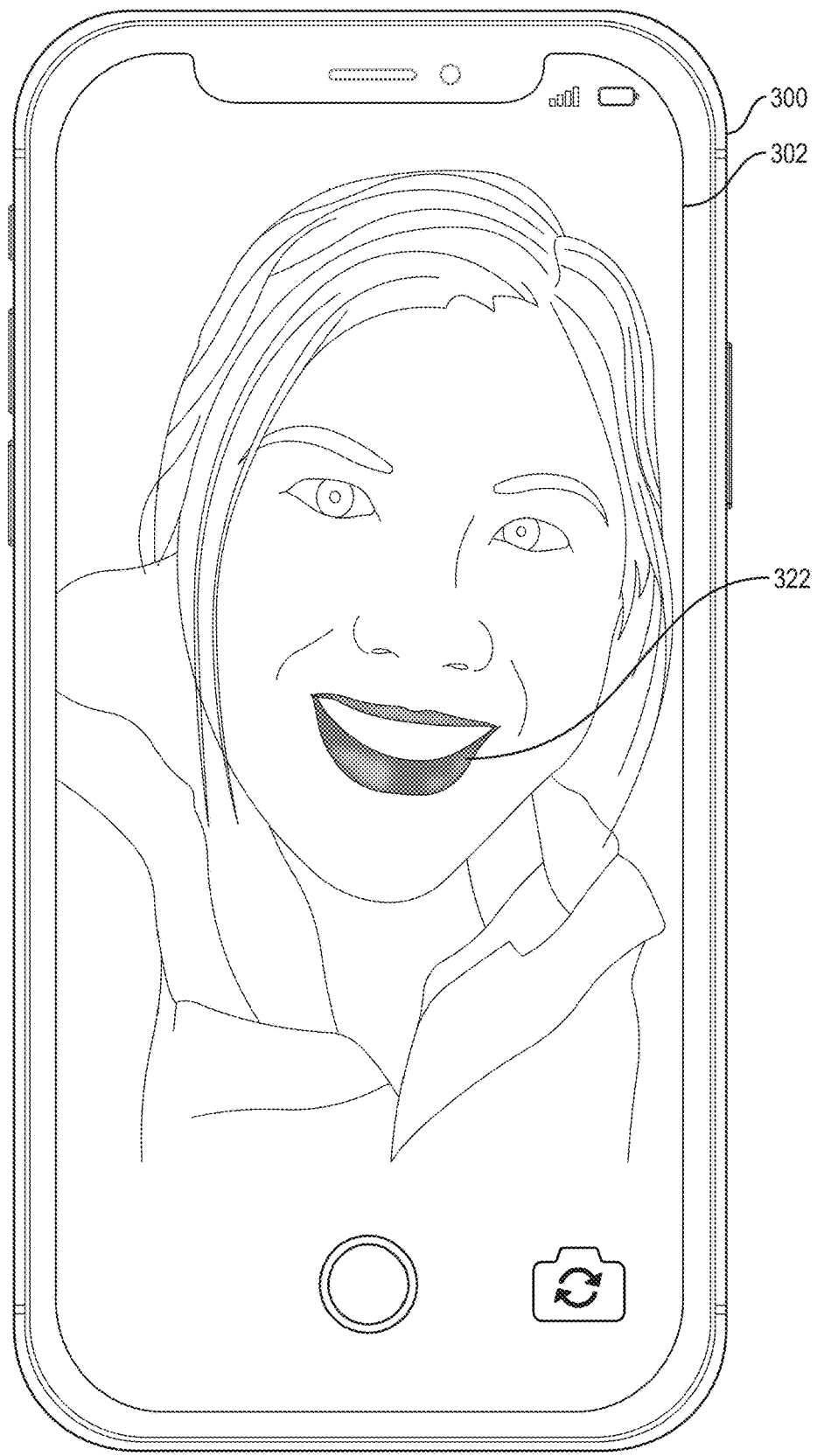

Turning now to FIGS. 3A-3I, various operations in a process for using augmented reality to digitally render makeup in a video stream in accordance with one or more embodiments are illustrated. One will appreciate in light of the disclosure herein, that alternative embodiments can include fewer acts, different acts, additional acts, or perform the acts described in reference to FIGS. 3A-3I in a differing order. For example, FIG. 3A illustrates a video stream of a user within a client application of a client device. FIGS. 3B-3H illustrate processing steps for applying a makeup texture to a three-dimensional mesh of the user's face. FIG. 3I illustrates a video stream with an augmented reality environment including digitally rendered makeup on the user's face.

As mentioned, FIG. 3A illustrates a client device 300 that utilizes a client application 302 to capture a video stream of a user. For example, the client device 300 can include a mobile phone with a digital camera 304 for capturing images or video of the user. As shown, the digital camera 304 can be on a front portion of the client device 300 to allow the user to view a user interface while also capturing video of the user. Specifically, the client device 300 can allow the user to take videos or images of the user with the digital camera 304 or to take videos/images of other people or scenes using a digital camera on a back side of the client device 300. Accordingly, while the processes for digitally rendering makeup are described in FIGS. 3A-3I, the client device 300 can provide for digitally rendering makeup on other users using another digital camera.

In one or more embodiments, the AR makeup system 102 allows the user to select a makeup product to apply to a portion of the user's face. For example, the AR makeup system 102 can allow the user to select from a plurality of makeup products. The client device 300 can access the plurality of makeup products from a local storage device or from a remote storage device (e.g., the server device(s) 106 of FIG. 1). In any case, the AR makeup system 102 can update the available products at any time, including adding products, removing products, or modifying existing products.

The client application 302 can display the plurality of makeup products as a plurality of selectable icons 306a-306d in the user interface. For example, the client application 302 can display the selectable icons 306a-306d as overlays on top of the video of the user. Furthermore, while FIG. 3A illustrates a set of products available to the user, the AR makeup system 102 can provide any number of products, such as in a scrollable set of products, a nested set of products, or other grouping of products.

In one or more embodiments, the user selects a makeup product by selecting a corresponding icon. For instance, the user can select a first product to render within the video stream by selecting a first icon 306a (e.g., by tapping on the first icon 306a). Similarly, the user can select a second product by selecting a second icon 306b. As described in more detail below, when the user selects an icon, the AR makeup system 102 determines the corresponding product and begins the process of rendering the product on the user's face in the video stream using an augmented reality environment.

In response to the user selecting a product to render in the video stream, the AR makeup system 102 can generate a three-dimensional mesh corresponding to an identified face in the video stream. FIG. 3B illustrates a three-dimensional mesh 308 corresponding to an identified face in a video stream. In particular, the AR makeup system 102 can employ a facial landmark tracking algorithm. As part of the facial landmark tracking process, the AR makeup system 102 can identify facial landmarks (e.g., corners of the eyes, lips, nose, hairline). Having identified facial landmarks, the AR makeup system 102 can fit a generic or template mesh of a face to the identified facial landmarks to generate the three-dimensional mesh 308 corresponding to an identified face. For example, the AR makeup system 102 can implement the facial landmark tracking algorithm set forth in Jason M. Saragih, Simon Lucey, and Jeffrey F. Cohn, *Deformable model fitting by regularized landmark meanshift*, International Journal of Computer Vision 91.2 200-215 (2011), which is incorporated herein by reference in its entirety. In particular, in one or more embodiments, the AR makeup system 102 uses a pre-generated mesh to generate the three-dimensional mesh. In particular, the AR makeup system 102 can use the pre-generated mesh as a template for generating the three-dimensional mesh 308 by adjusting the pre-generated mesh to fit to the identified face in the video stream. Accordingly, the AR makeup system 102 can modify vertices and/or polygons of the pre-generated mesh to mold the mesh to the user's face, resulting in the three-dimensional mesh 308.

As mentioned, the AR makeup system 102 can use face-tracking software to track the user's face in the video stream. The AR makeup system 102 can then generate the three-dimensional mesh 308 by creating a plurality of polygons in a wireframe mesh that maps to the shape of the user's face. The three-dimensional mesh 308 also tracks with the user's face as the user moves in the video stream. For example, in one or more embodiments, the AR makeup system 102 can use motion detection tools such as the core motion framework in iOS to aid in tracking. In still further embodiments, the AR makeup system 102 can use KLT: Kanade-Lucas-Tomasi feature tracker or ORB: Oriented FAST and Rotated BRIEF method to aid in tracking.

Furthermore, the AR makeup system 102 identifies different regions of the face within the three-dimensional mesh 308. Specifically, the AR makeup system 102 identifies regions of the face to which the AR makeup system 102 can apply various makeup products. For example, the AR makeup system 102 can identify facial features such as the user's eyes, mouth, nose, cheeks, etc., corresponding to the different regions where the AR makeup system 102 can apply makeup. In one or more embodiments, the AR makeup system 102 labels each separate region by labeling the regions based on groupings of polygons and/or vertices of the three-dimensional mesh 308.

To illustrate, in response to the user selecting a lipstick makeup product, the AR makeup system 102 can generate a mask for a corresponding portion of the three-dimensional mesh 308. In particular, FIG. 3C illustrates the three-dimensional mesh 308 including a makeup selection mask 310 corresponding to a lip area of the user's face. The AR makeup system 102 can generate the makeup selection mask 310 by selecting the polygons and/or vertices of the three-dimensional mesh 308. The AR makeup system 102 can also label the makeup selection mask 310 as a lip region. Similarly, the AR makeup system 102 can generate and label an eyelid region, a cheek region, etc., for generating different selection masks and applying different makeup products to the user's face.

In one or more embodiments, the AR makeup system 102 generates various masks from the three-dimensional mesh 308 prior to receiving a makeup selection. In particular, the AR makeup system 102 can generate a lip mask, an eyelid mask, a cheek mask, etc., at the time of generating the three-dimensional mesh 308. For instance, the AR makeup system 102 can label different regions of a pre-generated face mesh and retain the labeled regions based on adjustments the AR makeup system 102 makes to the pre-generated mesh in generating the three-dimensional mesh 308. The AR makeup system 102 can thus quickly generate makeup selection masks in response to receiving makeup selections by identifying previously labeled portions of the three-dimensional mesh 308.

Based on the selected makeup product, the AR makeup system 102 can apply a base color (e.g., an albedo color) to the makeup selection mask. FIG. 3D illustrates the three-dimensional mesh 308 including a base makeup color 312 to the makeup selection mask 310 of FIG. 3C. The base makeup color 312 can include an RGB value corresponding to the makeup product. For example, the AR makeup system 102 can generate a texture using the base makeup color 312 and then apply the texture to the makeup selection mask 310 of the three-dimensional mesh 308.

Because the base makeup color 312 is a solid color with a single RGB value, displaying the base makeup color 312 directly within the video stream without any additional adjustments would provide an inaccurate coloring. Accordingly, the AR makeup system 102 applies color adjustments to the texture including the base makeup color 312, as described in more detail below. Also as described in more detail below, the AR makeup system 102 can apply lighting adjustments to the base makeup color 312 based on the environment lighting and/or facial textures.

In one or more embodiments, the AR makeup system 102 generates a makeup material map 314 based on a material of the selected makeup product, as illustrated in FIG. 3E. The makeup material map 314 can represent light-responsive properties of the makeup material. Accordingly, the makeup material map 314 is different for each possible material for the makeup product, as described in more detail below with respect to FIGS. 4A-4D. The AR makeup system 102 can generate shader models for the different materials of a product to generate a makeup material map to apply the corresponding region of the three-dimensional mesh 308 based on the shader model(s) associated with the material of the makeup selection. As illustrated in FIG. 3E, the makeup material map 314 includes a mapping of the light-responsive material to the lip region of the three-dimensional mesh 308 prior to combining the makeup material map 314 with the makeup color.

As previously described, the AR makeup system 102 extracts luminance frequencies from an image frame of the digital stream. FIG. 3F illustrates a luminance texture 316 based on the image frame of the digital stream of FIG. 3A. Specifically, the AR makeup system 102 uses a desaturated version of the image frame to extract different sets of frequencies from the image frame. To illustrate, the AR makeup system 102 determines a first set of frequencies that includes mid-range frequencies of the image frame. The AR makeup system 102 also determines a second set of frequencies that includes low-range frequencies of the image frame.

The AR makeup system 102 uses the extracted frequencies to modify the base makeup color 312. As shown in FIG. 3G, the AR makeup system 102 blends the sets of luminance frequencies with the base makeup color 312 to create a blended makeup color 318. In one or more embodiments, the AR makeup system 102 generates the blended makeup color 318 by first blending the base makeup color 312 with the first set of frequencies (i.e., the mid-range frequencies). More specifically, the AR makeup system 102 screens the mid-range frequencies over the base makeup color to lighten the base makeup color based on the mid-range frequencies. For instance, the AR makeup system 102 can apply a fifty percent blend when screening the mid-range frequencies on top of the base makeup color 312.

After blending the base makeup color 312 and the low-range frequencies, the AR makeup system 102 blends the output of the screening function with the second set of frequencies. For instance, the AR makeup system 102 can blend the screening function output with the low-range frequencies by multiplying the low-range frequencies on top of the screening function output (e.g., using a fifty percent blend). In particular, because the screening function lightens the base makeup color as a whole using the mid-range frequencies, the AR makeup system 102 uses the low-range frequencies to darken portions of the base makeup color 312 corresponding to darker portions of the image frame. In one or more embodiments, multiplying the low-range frequencies on top of the screened color can darken areas of the screened color to match, or be similar to, darker areas of the image frame without darkening the highlighted areas of the screened color.

In one or more embodiments, blending the base makeup color 312 with the luminance texture 316 is shown in the algorithms below:

$$L(v,\min,\max)=\max(0,v-\min)/\max(\in,\max-\min)$$

$$F_1=L(\varphi_{luma},0.4,0.8), F_2=L(\varphi_{luma},0.2,0.5)$$

$$X_1=\text{Lerp}(\text{Screen}(F_1,I_{makeup}),I_{makeup},\alpha)$$

$$X_2=\text{Lerp}(\text{Multiply}(X_1,F_2),F_2,\beta)$$

In particular, the AR makeup system 102 can extract the luminance values as a vector v. The AR makeup system 102 can then normalize the luminance values using a minmax normalization technique. Once the luminance values are normalized, the AR makeup system 102 can identify a mid-range frequencies (e.g., $F_1$) having values, for example, between 0.4 and 0.8. The AR makeup system 102 can identify a low-range frequencies (e.g., $F_2$) having values, for example, between 0.2 and 0.5, as shown by line 2. In one or more embodiments, the bounds of the mid-range and low-range frequencies are user selected or empirically learned. As shown by line 3, the AR makeup system 102 blends (e.g., using a linear interpolation function Lerp) the makeup color $I_{makeup}$ with the mid-range frequencies $F_1$. In particular, the AR makeup system 102 screens the mid-range frequencies $F_1$ over the base makeup color $I_{makeup}$ to lighten the base makeup color based on the mid-range frequencies $F_1$. For instance, the AR makeup system 102 can apply a percentage blend, based on input α, (such as 50%) when screening the mid-range frequencies on top of the base makeup color $I_{makeup}$. The AR makeup system 102 blends the output of the screening function $X_1$ with the low-range frequencies $F_2$. For instance, the AR makeup system 102 can blend the screening function output $X_1$ with the low-range frequencies $F_2$ by multiplying the low-range frequencies $F_2$ on top of the screening function output $X_1$ based on input β, (such as 50%) to generate $X_2$ the output of the multiplier function.

In addition to blending the base makeup color 312 with the luminance texture 316, the AR makeup system 102 can also generate the blended makeup color 318 using an ambient occlusion map for the corresponding region of the image frame. Specifically, the ambient occlusion map allows the AR makeup system 102 to apply simulated shading to the makeup texture based on the shading of the region in the image frame. To illustrate, the AR makeup system 102 can generate the ambient occlusion map using an ambient occlusion shader on the geometry of the three-dimensional mesh 308 (or specific portions of the three-dimensional mesh 308 such as the lip region). The AR makeup system 102 can then generate the blended makeup color 318 by combining the base makeup color 312 with the luminance texture 316 and an ambient occlusion map.

After generating the blended makeup color 318 in the RGB color space, the AR makeup system 102 converts the blended makeup color 318 to the LAB color space to apply makeup materials to the makeup color. FIG. 3H illustrates the three-dimensional mesh 308 with makeup materials applied to the makeup color to generate a material-modified color 320. In particular, the AR makeup system 102 applies the makeup material by combining a corresponding makeup material map (e.g., makeup material map 314 of FIG. 3E) with the blended makeup color 318 in the LAB color space. More specifically, applying the makeup material map involves applying one or more shader models to the blended makeup color 318 in the LAB color space based on a predetermined combination of the shader models corresponding to the material of the makeup product. In one or more embodiments, the shader models are shown in the algorithms below:

$$\varphi_{shine} = \frac{Lab_L^{shinePower}}{2} + \frac{Lab_L}{2}$$

$$\varphi_{gloss}=H(0,100,\varphi_{shine})*100$$

$$Lab_L=\varphi_{gloss}+\text{threshold}*\text{glossAlpha}*\text{luma}^{1+\gamma*glossPower}$$

where $\varphi_{shine}$ represents a shine model or $\varphi_{gloss}$ represents a gloss model, and $Lab_L$ represents a modified lightness of the makeup color in the LAB color space. Furthermore, gloss-Alpha, glossPower, and shinePower represent variables corresponding to shine and gloss to apply to the color based on the material of the makeup product, where shinePower is further a function of a shineAlpha variable. In one or more embodiments, the AR makeup system 102 assigns glossAlpha, glossPower, shineAlpha, and shinePower variables to RGB and alpha values (e.g., glossAlpha to a red value, glossPower to a green value, shineAlpha to a blue value, and shinePower to an alpha value) to easily package the material values for application in the LAB color space.

In addition to providing the shader models to the makeup color, the AR makeup system 102 can also apply a smoother highlight by applying a threshold to a gloss value associated with the makeup color. The threshold can set a maximum value of the gloss value to limit the lightness of the materials applied to the makeup color. Furthermore, after applying the materials to the makeup color in the LAB space, the AR makeup system 102 can convert the updated makeup color back to the RGB color space.

Additionally, in one or more embodiments, the AR makeup system 102 also applies environment lighting to the makeup to simulate reflections over bright makeup areas for the material-modified color 320. For example, the AR makeup system 102 can apply an environment map that includes one or more light sources in the augmented reality environment to provide additional lighting on the applied makeup. Makeup that has highly reflective properties will thus include bright reflections based on the positioning of the light sources, while makeup that is less reflective may have softer reflections based on the positioning of the light sources. In at least some implementations, the AR makeup system 102 includes light sources with low-frequency studio lighting oriented according to the user's client device. In alternative embodiments, the AR makeup system 102 orients the lights based on detected lighting in the user's environment.

In one or more embodiments, once the AR makeup system 102 has applied the makeup materials and lighting effects to the makeup color, the AR makeup system 102 can display the modified makeup color in the video stream. Specifically, the AR makeup system 102 can generate an augmented reality layer including rendered makeup 322 on three-dimensional mesh corresponding to the identified face in the video stream. The AR makeup system 102 can then display the rendered makeup 322 in each image frame of the video streams, as illustrated in FIG. 3I. Accordingly, the AR makeup system 102 can display the makeup product with the modified color on top of the video stream so that the makeup product follows the movement of the user's face. To illustrate, applying a lipstick product in an augmented reality layer causes the lipstick product to follow the user's lips, including when the user opens, closes, or otherwise deforms the lips during the video stream.

As mentioned, the AR makeup system 102 can generate a plurality of shader models for rendering various makeup materials in an augmented reality environment. Specifically, as described previously, when generating the material-modified color 320, the AR makeup system 102 can use pre-generated material maps. FIGS. 4A-4D illustrate a plurality of different material maps 400a-400d and their corresponding rendered results 402a-402d. As shown, each of the materials (gloss, glitter, matte, metallic) has different light-responsive properties. Accordingly, when generating the different material textures, the AR makeup system 102 uses different combinations of the shine and gloss models to produce the different render effects for the various materials. While FIGS. 4A-4D illustrate four different makeup materials, the AR makeup system 102 can generate material maps for other materials such as velvet.

In particular, FIG. 4A illustrates a lipstick makeup product with glossy characteristics. The AR makeup system 102 can generate a material map 400a (or texture) corresponding to a gloss material. As illustrated, the rendered result 402a of the material map 400a includes reflective properties that correspond to the gloss material based on the AR makeup system 102 modifying a selected makeup color to have light-reflective characteristics of the gloss material. Additionally, FIG. 4B illustrates a material map 400b for a lipstick product with a glitter material and a render result 402b demonstrating a look of the glitter material in a rendered environment. FIG. 4C illustrates a material map 400c for a lipstick product with a matte material and a render result 402c showing a look of the matte material in a rendered environment. FIG. 4D illustrates a material map 400d for a lipstick product with a metallic material (or metallic light-responsiveness) and a render result 402d demonstrating a look of the metallic material in a rendered environment.

As shown, each of the materials has different light responsive characteristics. For instance, the glossy material has stronger, clearer reflective properties than the matte material. FIG. 4A illustrates the light responsiveness of the material map 400a corresponding to the gloss material by including larger light-colored areas than the matte material. Similarly, the material map 400b corresponding to the glitter material, illustrated in FIG. 4B, has high light responsiveness, but the reflective material is arrayed in a scattered pattern, rather than a continuous material pattern such as is included in the material map 400a for the gloss material. Furthermore, the material map 400c corresponding to the matte material, illustrated in FIG. 4C, has lower light responsiveness than the glitter material or the glossy material, while the material map 400d corresponding to the metallic material has the highest light responsiveness.

Figure 5A:
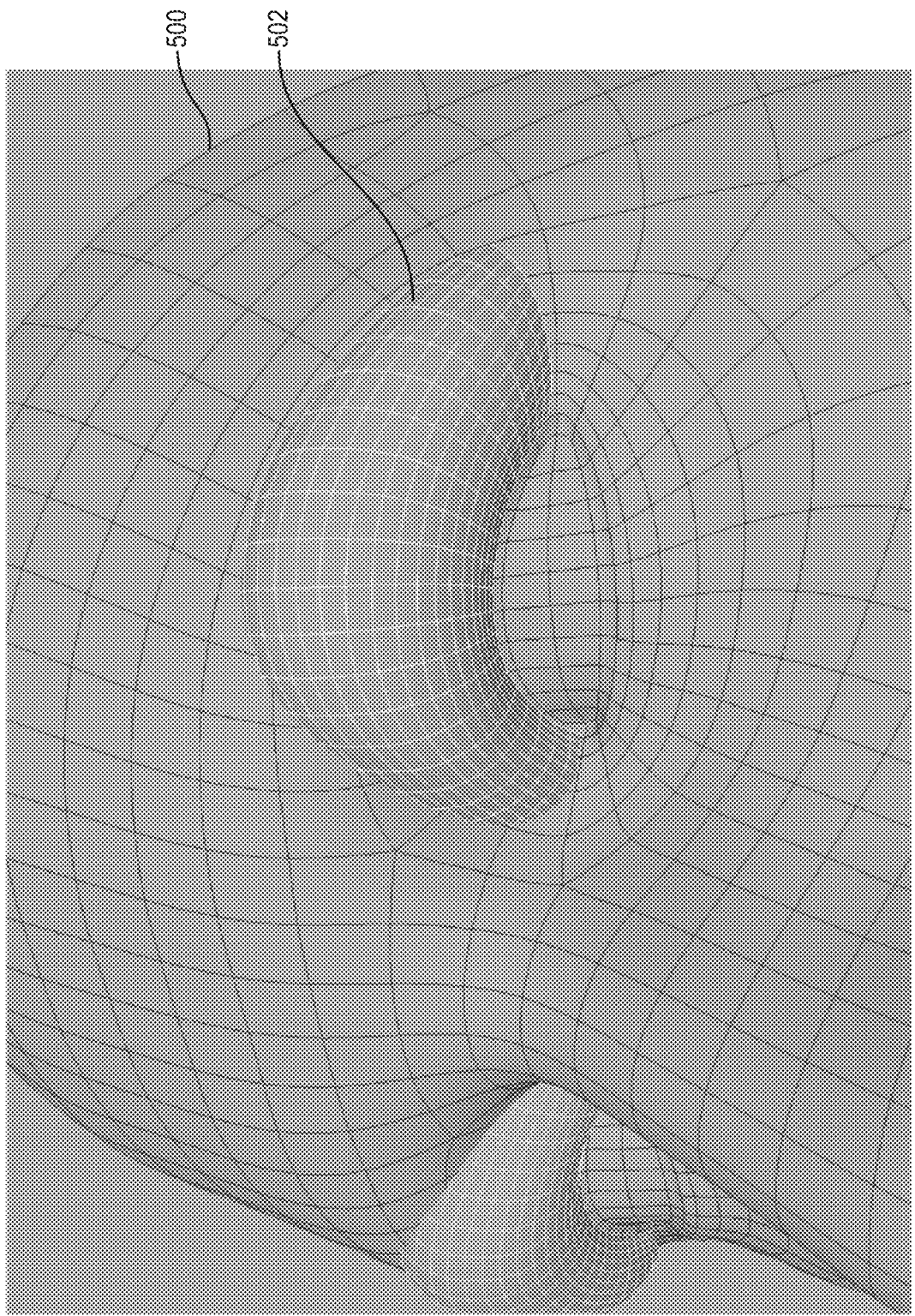
FIGS. 5A-5C illustrate example diagrams of accessory meshes in an augmented reality environment in accordance with one or more implementations.
Figure 5B:
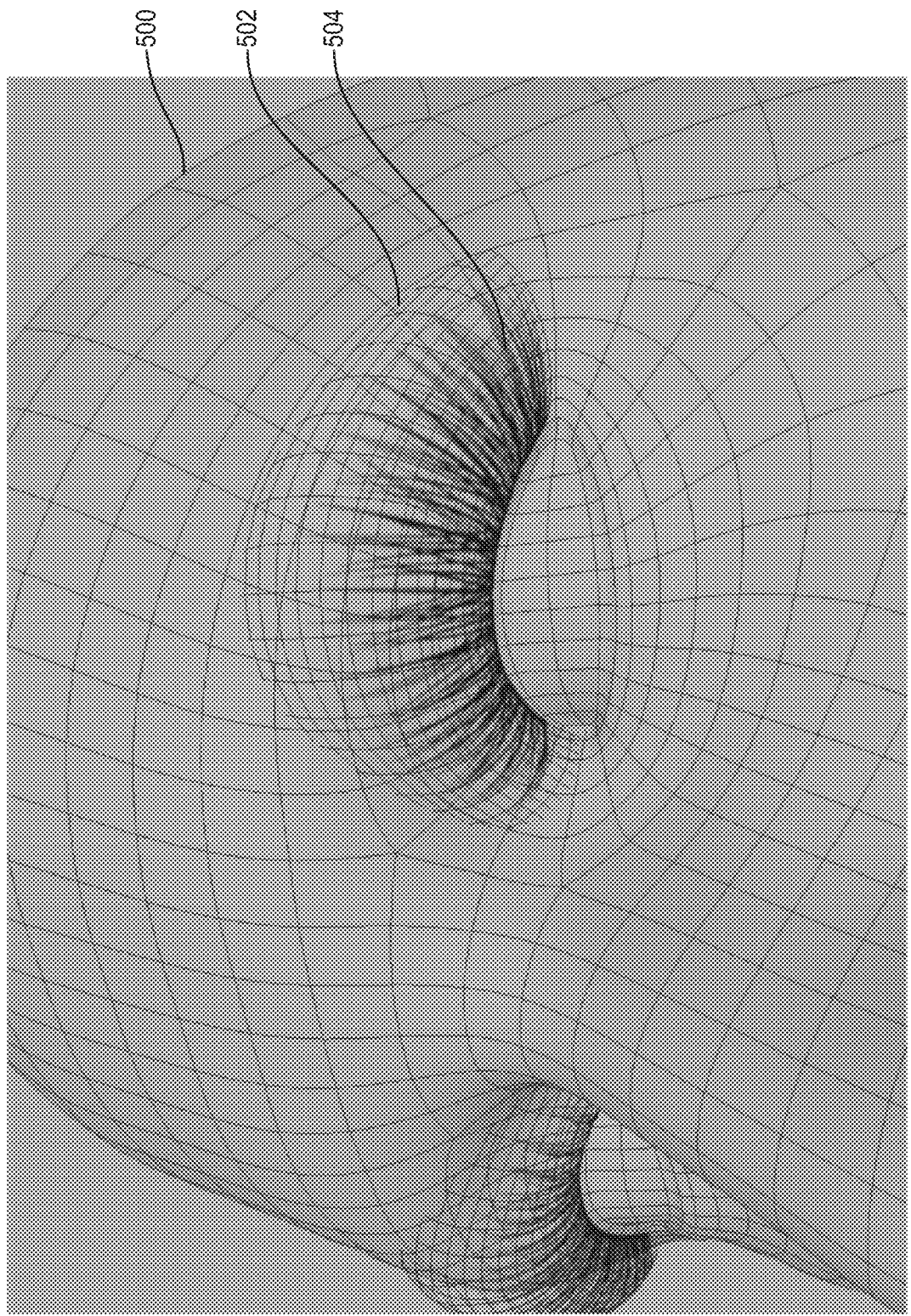
Figure 5C:
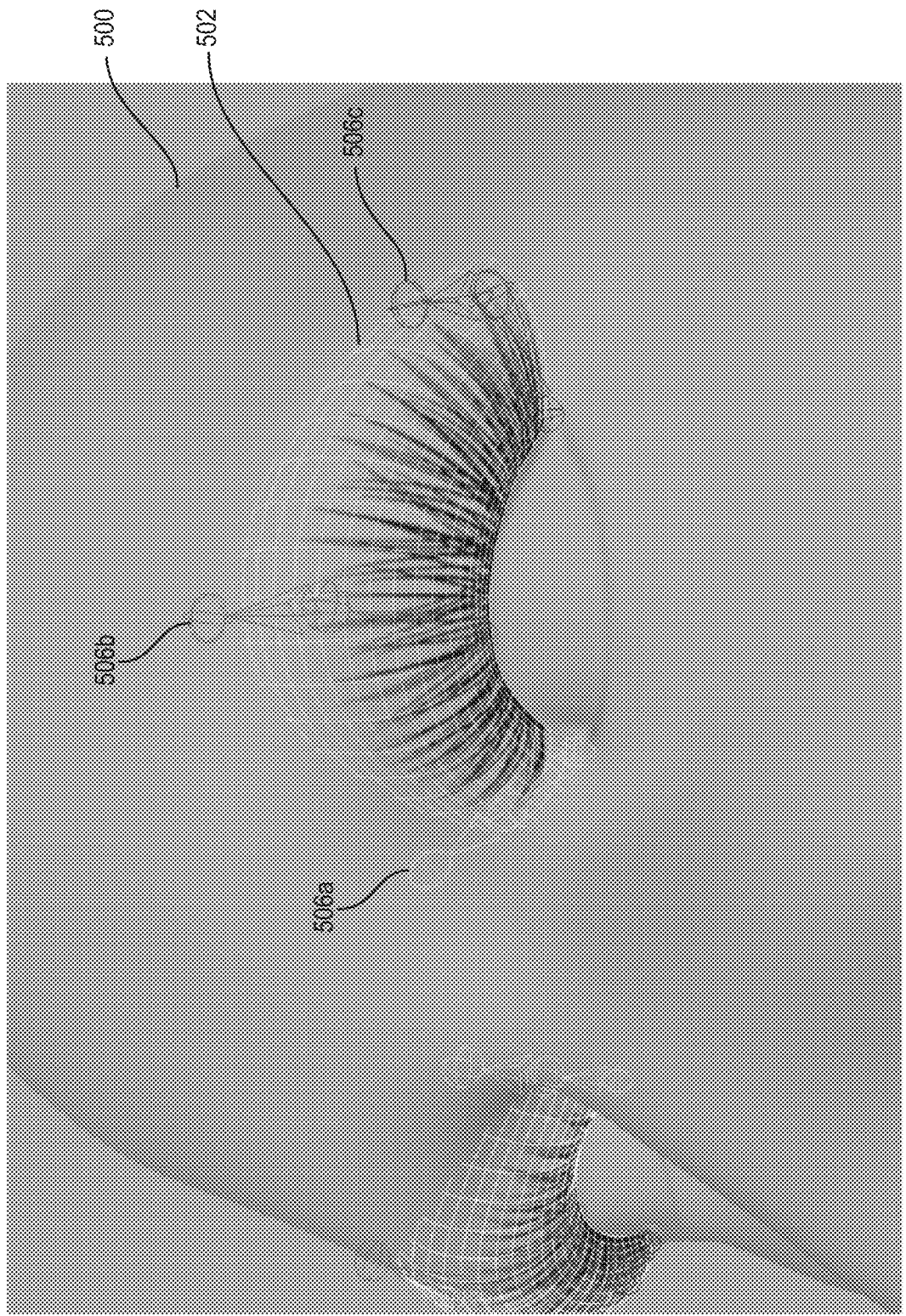

As mentioned, the AR makeup system 102 can also allow a user to apply various makeup accessories in the augmented reality environment in addition to makeup products. FIGS. 5A-5C illustrate example diagrams of a process of adding an eyelash accessory within an augmented reality environment. FIG. 5A illustrates a face mesh 500 corresponding to a user's face including an accessory mesh 502 that the AR makeup system 102 adds to the face mesh 500. FIG. 5B illustrates the accessory mesh 502 with an accessory texture 504. FIG. 5C illustrates the accessory mesh 502 with movable joints 506a-506c that allow the AR makeup system 102 to animate the accessory.

In particular, FIG. 5A illustrates a face mesh 500 corresponding to a face that the AR makeup system 102 identifies in a video stream, as described previously with respect to FIG. 3B. In addition to adding makeup products to a user's skin within an augmented reality environment for a video stream, the AR makeup system 102 can allow a user to select one or more makeup accessories or other facial accessories to render within the augmented reality environment. For example, in response to receiving a request to add an eyelash accessory to the user's face, the AR makeup system generates an accessory mesh 502 corresponding to the eyelash accessory. In one or more embodiments, the AR makeup system 102 generates the accessory mesh 502 to have a shape that approximates the shape of the accessory (e.g., a strip-like mesh for eyelashes).

Additionally, the AR makeup system 102 can attach the accessory mesh 502 to the face mesh 500 so that the accessory mesh 502 follows the movement of the user's face within the video stream. In one or more embodiments, the AR makeup system 102 attaches the accessory mesh 502 to the face mesh 500 using a plurality of joints at a plurality of UV coordinates of the face mesh 500. For instance, the AR makeup system 102 can pin one or more corners or edges to the face mesh 500 by connecting vertices of the accessory mesh 502 to vertices of the face mesh 500.

In one or more embodiments, the AR makeup system 102 renders the accessory in the augmented reality environment by assigning an accessory texture 504 to the accessory mesh 502. As illustrated in FIG. 5B, the accessory texture 504 includes an eyelash texture for portions of the accessory mesh that do not include eyelashes. The accessory texture 504 can include alpha mapping that allows portions of the texture to be transparent or translucent. For instance, an eyelash texture includes transparent portions where the eyelashes do not cover on the accessory mesh 502. Accordingly, the accessory texture 504 can include transparency values for portions of the accessory mesh 502 so that portions not textured with eyelash lines do hide the underlying textures corresponding to the face mesh 500.

In addition to pinning the accessory mesh 502 to the face mesh 500 and assigning the accessory texture 504 to the accessory mesh 502, the AR makeup system 102 can also animate the accessory mesh 502 based on movement of the user's face in the video stream. Specifically, as illustrated in FIG. 5C, the AR makeup system 102 animates the accessory mesh 502 by inserting a plurality of movable joints 506a-506c at different positions of the accessory mesh 502. The AR makeup system 102 can set the movable joints 506a-506c by setting a root node of each movable joint and pinning the root node to a tracking point corresponding to the face mesh 500. Thus, as the user's face moves within the video stream, the movable joints move with the user's face.

Furthermore, the movable joints 506a-506c allow the AR makeup system 102 to pose or deform the accessory mesh 502 based on the movement of the root nodes. In particular, the AR makeup system 102 can configure the movable joints 506a-506c to cause transformations and/or deformations of the accessory mesh 502 (or portions of the accessory mesh 502) so that translations and/or deformations to the accessory texture 504 appear natural in the augmented reality environment. For instance, when the user blinks in the video stream, the AR makeup system 102 can move the movable joints 506a-506c to make rendered eyelashes move naturally to a closed-eye position and then back with the movement of the user's eyelids. Similarly, the AR makeup system 102 can render and animate other accessories such as earrings, including adding additional animations based on movement of the user's head (e.g., based on momentum), gravity, or the like, to provide realistic accessory animations.

Figure 6:
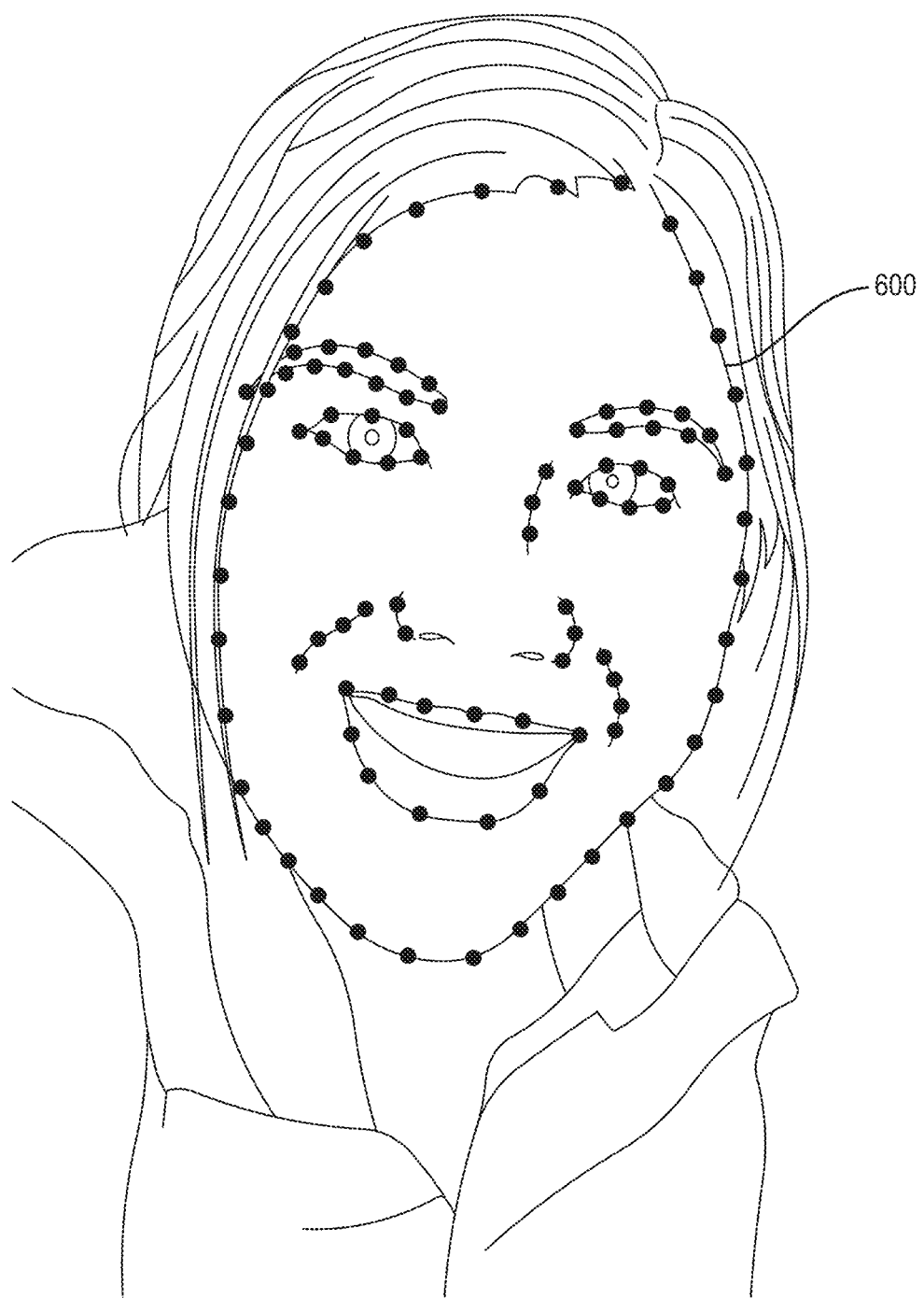
FIG. 6 illustrates face edge detection in a skin smoothing process in accordance with one or more implementations.
Figure 7A:
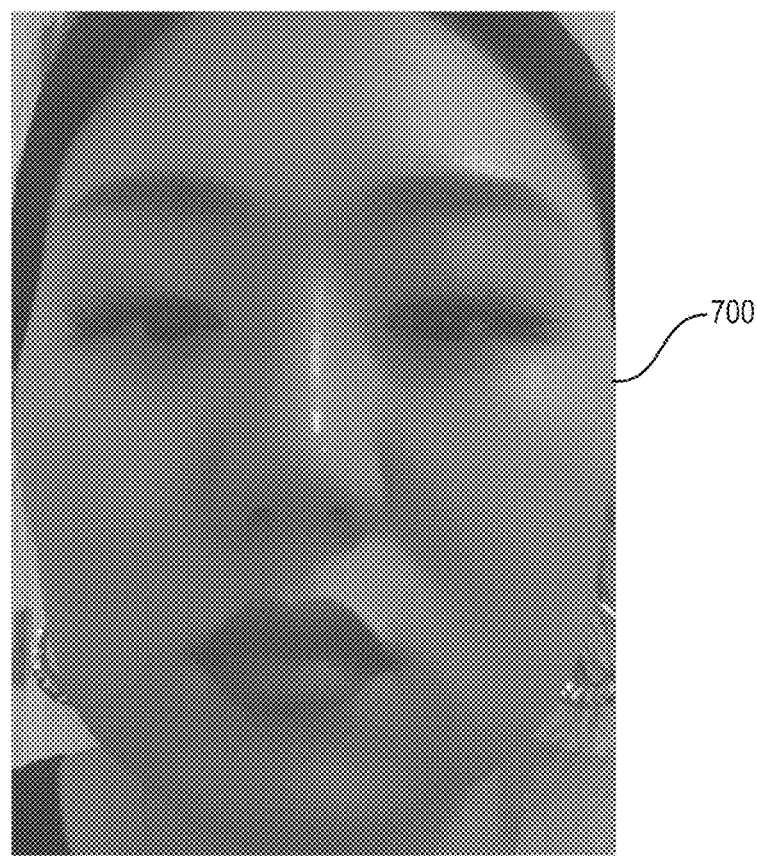
FIGS. 7A-7B illustrate images in a localized tone mapping process in accordance with one or more implementations.
Figure 7B:
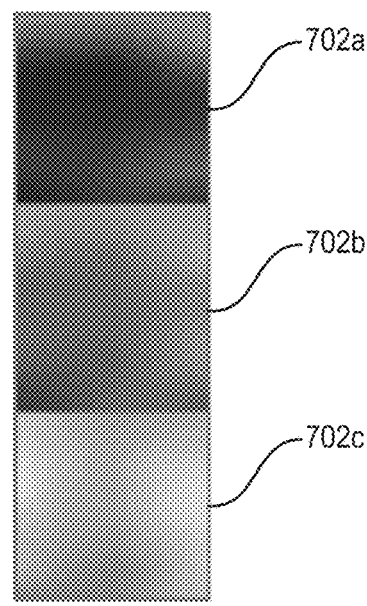

The AR makeup system 102 can also apply additional post-processing to a video stream to alter one or more characteristics of the user's face for display within the augmented reality environment. In one or more embodiments, the AR makeup system 102 applies skin smoothing to skin of the user's face and localized tone mapping of applied makeup to match the real-world environment. FIG. 6 illustrates a process for identifying an area of a user's face for applying skin smoothing (e.g., mimicking foundation makeup products). FIGS. 7A-7B illustrate images in a process for applying localized tone mapping to the makeup/accessories.

As mentioned, FIG. 6 illustrates a process for identifying portions of a user's face to use in applying skin smoothing. In particular, the AR makeup system 102 applies skin smoothing to only a portion of the user's face (i.e., the skin of the user's face) to remove high frequency details such as blotches or other skin imperfections. The AR makeup system 102 can utilize a smoothing algorithm that identifies the edges of the user's face at the boundaries of facial features such as the mouth and eyes. The AR makeup system 102 can also identify sharp features of the user's face including well-defined wrinkles or creases. As shown in FIG. 6, the AR makeup system 102 can determine a region 600 for smoothing by identifying edges or sharp features of the user's face that correspond to the skin of the user's face. As mentioned above, the AR makeup system 102 can identify portions of a user's face to apply skin smoothing using the techniques described in Jason M. Saragih, Simon Lucey, and Jeffrey F. Cohn, *Deformable model fitting by regularized landmark mean-shift*, International Journal of Computer Vision 91.2 200-215 (2011), which is incorporated herein by reference in its entirety.

In one or more embodiments, the AR makeup system 102 utilizes an edge-aware algorithm that maintains the sharp features of the user's face such as a Fast Guided Filter. In one or more embodiments, the AR makeup system 102 uses the filter as described in Kaiming He, Jian Sun, *Fast Guided Filter*, arXiv:1505.00996 [cs.CV], (2015), which is hereby incorporated by reference. Specifically, a Fast Guided Filter can even out the natural tones of the skin of the user's face while preserving the edges of the face based on a guiding image that the AR makeup system 102 generates from the video stream. More specifically, the AR makeup system 102 can generate the guiding image for the Fast Guided Filter to use based on a luma of a downsampled image frame. For example, the AR makeup system 102 can determine a mean luma of the image frame as a guiding image and an RGB version of the image frame as inputs to the Fast Guided Filter.

The AR makeup system 102 then uses the Fast Guided Filter to compute the variance and covariance of the image frame and the guiding image in conjunction, resulting in scalar smoothed maps. The AR makeup system 102 can also pack the scalar smoothed maps into a single RGBA (RGB alpha) output. By packaging the scalar smoothed maps into a single output, the AR makeup system 102 eliminates additional processing, additional intermediate texture storage, and additional rendering passes. Accordingly, the AR makeup system 102 improves the processing speed and efficiency of client devices rendering makeup and skin smoothing in augmented reality environments over conventional systems. In particular when downsampling, the AR makeup system 102 can use a computing systems GPU bilinear minification filter in addition to a 2×2 box filter. By leveraging the GPU, the AR makeup system 102 improves the processing speed and efficiency. The AR makeup system 102 can alternatively use other filters for applying skin smoothing in the augmented reality environment, including bilateral filters, low-pass filters, or other guided filters based on the capabilities of the client device and/or desired output quality.

As mentioned previously, the AR makeup system 102 can share downsampling processes between the skin smoothing operations and tone mapping operations. In particular, the AR makeup system 102 also downsamples the video stream in one or more downsampling steps for applying localized tone mapping to the makeup and any added accessories. The AR makeup system 102 can use one or more of the downsampled image frames for the skin smoothing operations while using one or more of the downsampled image frames for the tone mapping operations, resulting in efficient use of the client device's processing and storage capabilities.

When performing localized tone mapping on an image frame, the AR makeup system 102 uses luma of the image frame to ensure that the makeup in the augmented reality environment matches the tones of the underlying image frame. FIGS. 7A-7B illustrate various steps in a process of applying localized tone mapping to a video stream. Specifically, FIG. 7A illustrates an embodiment of a captured image frame 700. FIG. 7B illustrates various extracted luma values (i.e., minimum luma 702a, average luma 702b, and maximum luma 702c in log space) corresponding to the image frame.

In one or more embodiments, the AR makeup system 102 uses a downsampled version of the image frame to determine values. For instance, the AR makeup system 102 can use a $\frac{1}{16}$ downsampled version of the image frame (e.g., by leveraging bilinear filtering of a graphics processing unit). The AR makeup system 102 can then divide the downsampled image frame into a plurality of sections (e.g., a 4×8 grid) and calculate the minimum luma 702a, the average luma 702b, and the maximum luma 702c in log space for each section, which provides the mean and range of log luma for tone mapping each section. In particular, the AR makeup system 102 determines the log-space luma values due to the nature of human vision perceiving luma logarithmically. Additionally, the AR makeup system 102 weights the average more towards the center of a display, which favors luma towards the center more than at the edges of the display under the assumption that video streams including faces (e.g., "selfie" videos/images) include the faces roughly centered on the display.

After calculating log luma values for each section of the downsampled image frame, the AR makeup system 102 modifies the augmented reality layer based on the log luma values. Specifically, the AR makeup system 102 uses the log luma values to determine an s-curve and then remaps the linear color values of the pixels to the s-curve. In other words, the AR makeup system 102 can shift the average log luma of each section based on a predetermined threshold. Remapping the color values of the pixels to the s-curve enhances the contrast of the augmented reality layer that matches the appearance of the real-world environment. Furthermore, localizing the tone mapping improves the overall visual quality of the augmented reality environment while making more efficient use of parallelism of the graphics processing unit. In one or more embodiments, the AR makeup system 102 uses localized tone mapping as described in Erik Reinhard, Michael Stark, Peter Shirley, and James Ferwerda, *Photographic Tone Reproduction for Digital Images*, Proceedings of the 29th Annual Conference on Computer Graphics and Interactive Techniques (SIGGRAPH 2002), which is hereby incorporated by reference in its entirety.

According to one experimental embodiment, the AR makeup system 102 tested rendering of makeup in video streams across a plurality of mobile devices, achieving more than 45 frames per second with render times between 7 milliseconds to 20 milliseconds. Additionally, the AR makeup system 102 can realistically render materials commonly used by makeup artists. This allows users to digitally try on makeup products in any location while viewing the effects of the makeup products in various lighting and environments.

Figure 8:
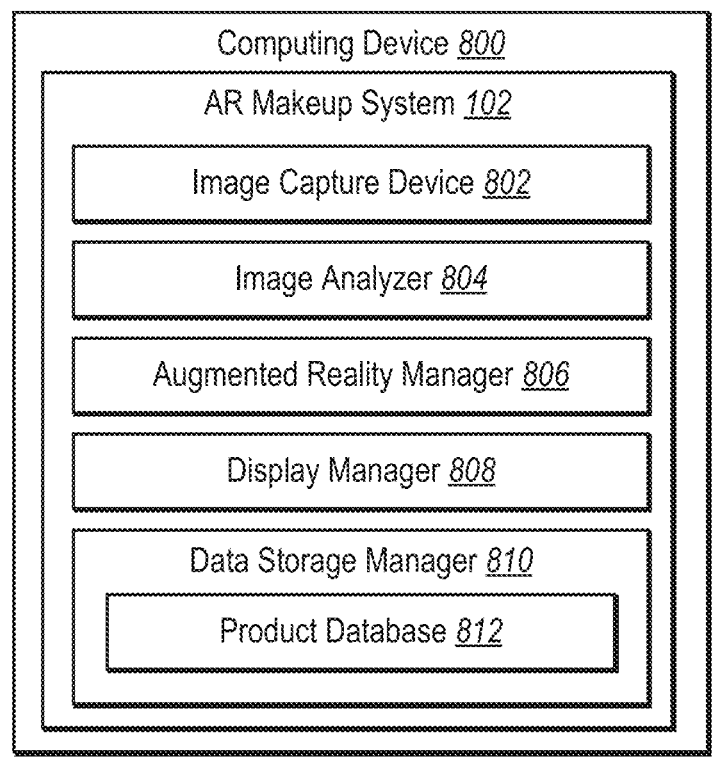
FIG. 8 illustrates a diagram of the augmented reality makeup system of FIG. 1 in accordance with one or more implementations.

As described in relation to FIGS. 1-7, the AR makeup system 102 can thus perform operations associated with rendering makeup products and accessories on a user's face in real-time within a video stream using an augmented reality environment. FIG. 8 illustrates a detailed schematic diagram of an embodiment of the AR makeup system 102 described above. As shown, the AR makeup system 102 can be implemented on computing device(s) 800 (e.g., a client device and/or server device as described in relation to FIG. 1, and as further described below in relation to FIG. 10). Additionally, the AR makeup system 102 can include, but is not limited to, an image capture device 802, an image analyzer 804, an augmented reality manager 806, a display manager 808, and a data storage manager 810. The data storage manager 810 can further include a product database 812. The AR makeup system 102 can be implemented on any number of computing devices. For example, the AR makeup system 102 can be implemented on a single computing device such as a single client device running a client application that renders makeup in an augmented reality environment. Alternatively, the AR makeup system 102 can be implemented in a distributed system of server devices that provides augmented reality makeup rendering for a plurality of client devices.

In one or more embodiments, each of the components of the AR makeup system 102 is in communication with other components using any suitable communication technologies. Additionally, the components of the AR makeup system 102 can be in communication with one or more other devices including other computing devices of a user, server devices (e.g., cloud storage devices or databases), licensing servers, or other devices/systems. It will be recognized that although the components of the AR makeup system 102 are shown to be separate in FIG. 8, any of the subcomponents may be combined into fewer components, such as into a single component, or divided into more components as may serve a particular implementation. Furthermore, although the components of FIG. 8 are described in connection with the AR makeup system 102, at least some of the components for performing operations in conjunction with the AR makeup system 102 described herein may be implemented on other devices within the environment.

The components of the AR makeup system 102 can include software, hardware, or both. For example, the components of the AR makeup system 102 can include one or more instructions stored on a computer-readable storage medium and executable by processors of one or more computing devices (e.g., the computing device(s) 800). When executed by the one or more processors, the computer-executable instructions of the AR makeup system 102 can cause the computing device(s) 800 to perform the augmented reality makeup rendering operations described herein. Alternatively, the components of the AR makeup system 102 can include hardware, such as a special purpose processing device to perform a certain function or group of functions. Additionally, or alternatively, the components of the AR makeup system 102 can include a combination of computer-executable instructions and hardware.

Furthermore, the components of the AR makeup system 102 performing the functions described herein with respect to augmented reality makeup rendering may, for example, be implemented as part of a stand-alone application, as a module of an application, as a plug-in for applications, as a library function or functions that may be called by other applications, and/or as a cloud-computing model. Thus, the components of the AR makeup system 102 may be implemented as part of a stand-alone application on a personal computing device or a mobile device. Additionally, or alternatively, the components of the AR makeup system 102 may be implemented in any application that allows augmented reality.

As mentioned, the AR makeup system 102 includes an image capture device 802. The image capture device 802 can include a digital camera that captures digital images or video. For example, the image capture device 802 can be a device on a front side of the computing device(s) 800 (e.g., on the front of a mobile phone) to allow a user of the client device to capture video of the user. The image capture device 802 can also store captured video on the computing device(s) (e.g., on the data storage manager 810) or on another device or system. The image capture device 802 can also include face tracking software to follow movements of faces in video streams.

The AR makeup system 102 also includes an image analyzer 804 to analyze digital images (e.g., individual image frames of a digital video stream). The image analyzer 804 can analyze images to determine characteristics of the images (e.g., colors, luma, luminance, lightness). The image analyzer 804 can also use image processing for identifying shapes (e.g., faces) within images. The image analyzer 804 can communicate image analysis information with the augmented reality manager 806 for generating augmented reality layers based on the analyzes images.

The AR makeup system 102 further includes an augmented reality manager 806 to facilitate the generation of augmented reality layers including rendered makeup and accessories in video streams. Specifically, the augmented reality manager 806 uses image information from the image analyzer 804 to generate and modify augmented reality layers including makeup selections for rendering within an augmented reality environment. For instance, the augmented reality manager 806 can modify a base color of a selected makeup product to include light-reactive properties of a material of the makeup product as well as incorporating environment lighting, skin tone, and other aspects of an environment that can affect the appearance of makeup on a person. The augmented reality manager 806 can then generate the augmented reality layers for presenting on top of video streams.

The AR makeup system 102 can also include a display manager 808 to facilitate display of augmented reality layers with a video stream. In particular, the AR makeup system 102 can use augmented reality layers from the augmented reality manager 806 to display the layers on top of the video stream. The display manager 808 can combine or otherwise pair the video stream with the augmented reality environment so that a display device of the computing device(s) 800 or another computing device includes the augmented reality layers on the video stream.

The AR makeup system 102 also includes a data storage manager 810 (that comprises a non-transitory computer memory) that stores and maintains data associated with analyzing images and displaying video within an augmented reality environment. For example, the data storage manager 810 can store image frames, analyzed image data (e.g., RGB values, LAB values, luma values, luminance values), face meshes, accessory meshes, and other data associated with rendering augmented reality makeup in a video stream.

Furthermore, the data storage manager 810 can include a product database 812 that includes a plurality of makeup products that a user can select to view within an augmented reality environment. For instance, the product database 812 can include makeup products that the user can view on different areas of the user's face. The product database 812 can also include information about the makeup products, including materials or colors. The product database 812 can also update the available makeup products periodically by adding, modifying, or removing makeup products.

Figure 9:
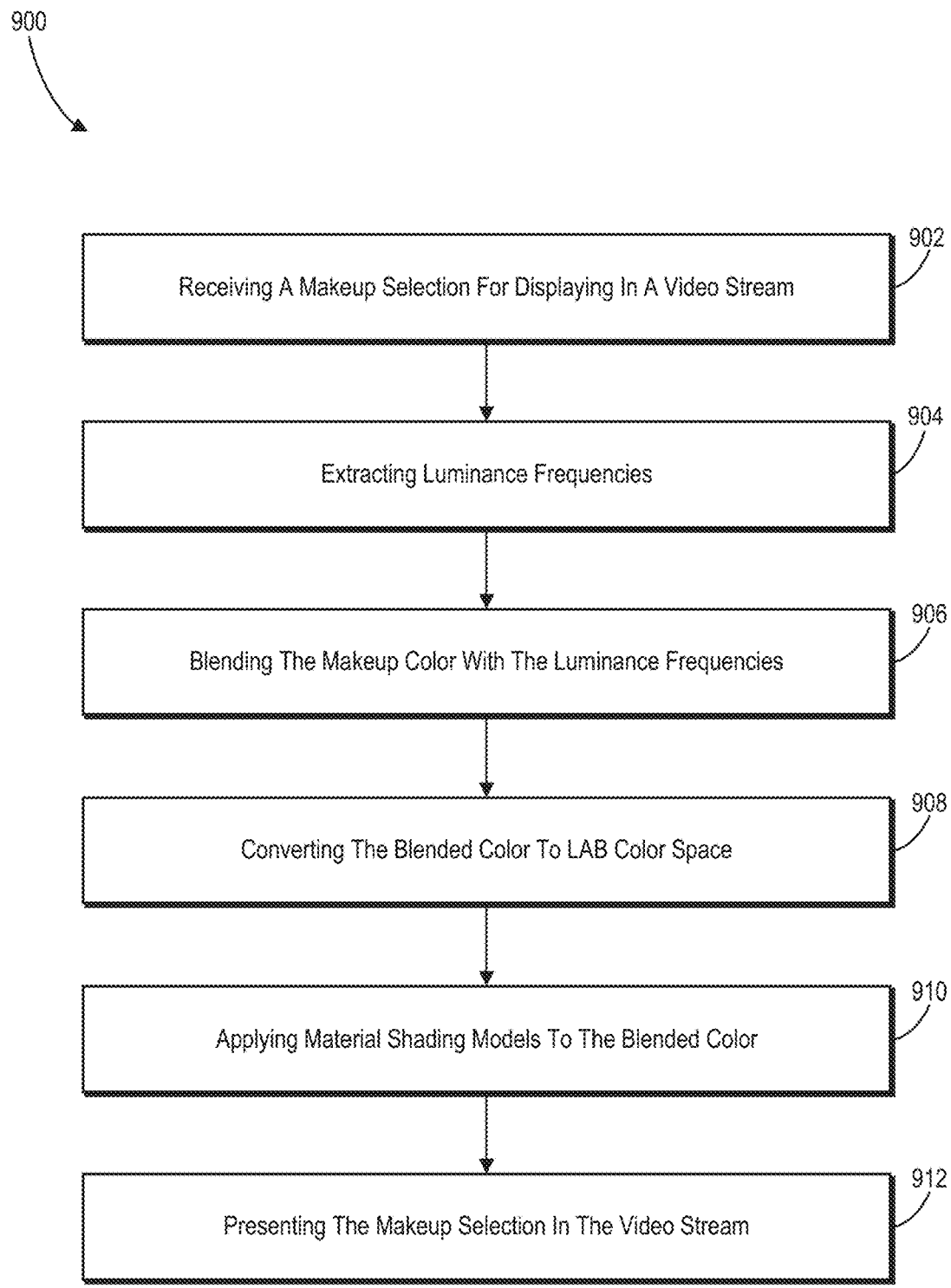
FIG. 9 illustrates a flowchart of a series of acts for applying augmented reality makeup in accordance with one or more implementations.

Turning now to FIG. 9, this figure shows a flowchart of a series of acts 900 of rendering makeup on a video stream in an augmented reality environment. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions that, when executed by one or more processors, cause a computing device to perform the acts of FIG. 9. In still further embodiments, a system can perform the acts of FIG. 9.

As shown, the series of acts 900 includes an act 902 of receiving a makeup selection for displaying in a video stream. For example, act 902 involves receiving a makeup selection to apply to an area of an identified face in a digital video stream, the makeup selection corresponding to a color in an RGB color space and a material. For example, the material can include a glossy material, a glitter material, a velvet material, a matte material, or a metallic material.

The series of acts 900 also includes an act 904 of extracting luminance frequencies. For example, act 904 involves extracting luminance frequencies from the digital video stream. Act 904 can involve desaturating a digital image frame of the digital video stream. Act 904 can involve extracting a set of mid-range frequencies and a set of low-range frequencies from the desaturated digital image frame of the digital video stream.

Additionally, the series of acts 900 includes an act 906 of blending the makeup color with the luminance frequencies. For example, act 906 involves blending, in the RGB color space, the color of the makeup selection with the luminance frequencies. Furthermore, act 906 can involve blending the color of the makeup selection with the set of mid-range frequencies by screening the makeup color with the set of mid-range frequencies to generate a first blend output. Additionally, act 906 can involve blending the first blend output with the set of low-range frequencies by multiplying the first blend output with the set of low-range frequencies to generate a second blend output.

The series of acts 900 further includes an act 908 of converting the blended color to LAB color space. For example, act 908 involves converting the blended color of the makeup selection to a LAB color space. Act 908 can involve converting the second blend output to the LAB color space. Furthermore, act 908 can involve converting the second blend output modified by an ambient occlusion map to the LAB color space.

The series of acts 900 also includes an act 910 of applying material shading models to the blended color. For example, act 910 involves modifying, in the LAB color space, a lightness of the blended color by applying at least one shading model based on the material corresponding to the makeup selection. Act 910 can involve applying a shine shader model and a gloss shader model based on the material of the makeup selection. For example, a material corresponds to a specific combination of the shine shader model and the gloss shader model to apply one or more lightness characteristics to the blended color in the LAB color space.

Additionally, the series of acts 900 includes an act 912 of presenting makeup selection in the video stream. For example, act 912 involves presenting, via a display screen of a client device, the makeup selection comprising the blended color with the modified lightness on the area of the identified face in the digital video stream. Act 912 can involve generating a three-dimensional mesh corresponding to the identified face, and presenting the makeup selection on an area of the three-dimensional mesh corresponding to the area of the identified face.

As part of act 912, or as an additional act, the series of acts 900 can include converting the blended color with the modified lightness from the LAB color space to the RGB color space prior to presenting the makeup selection via the display screen of the client device.

The series of acts 900 can also include receiving an accessory selection to attach an accessory to a second area of the identified face. In response to the accessory selection, the series of acts 900 can include adding an accessory mesh to a three-dimensional mesh corresponding to the identified face. Furthermore, the series of acts 900 can include applying an accessory texture comprising the accessory to the accessory mesh, and presenting, via the display screen of the client device, the accessory on the second area of the identified face in the digital video stream.

The series of acts 900 can also include generating, in response to adding the accessory mesh to the three-dimensional mesh corresponding to the identified face, an animation armature comprising a plurality of joints for the accessory mesh. The series of acts 900 can further include animating the accessory mesh using the animation armature in response to movement of the second area of the identified face in the digital video stream.

Additionally, the series of acts 900 can include generating a guiding image based on a luma of the digital video stream, and smoothing, using a fast guided blur filter, the identified face based on the guiding image. For example, smoothing the identified face can include applying a digitally rendered foundation makeup product to the identified face.

The series of acts 900 can also include dividing the digital video stream into a plurality of sections, and determining, for a section of the plurality of sections, an average log luma and a luma range. Furthermore, the series of acts 900 can include shifting, for the section of the plurality of sections, the average log luma based on a predetermined luma threshold to apply localized tone mapping to the digital video stream. Specifically, shifting the average log luma can involve remapping the color of each pixel in the makeup selection to an s-curve generated from the average log luma and the luma range.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
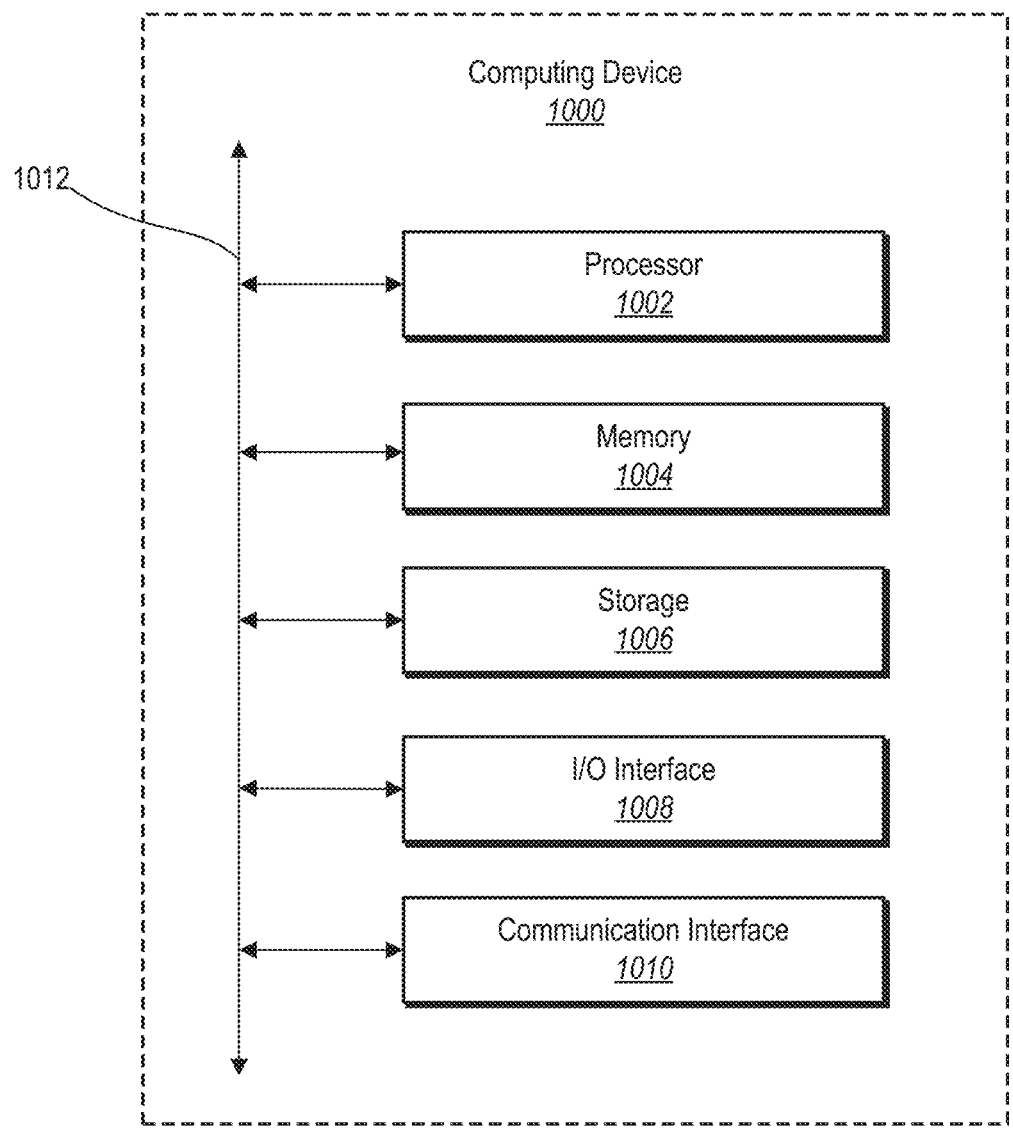
FIG. 10 illustrates a block diagram of an exemplary computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the AR makeup system 102. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions for dynamically modifying workflows, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions for performing the methods described herein.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

As mentioned above, the AR makeup system 102 can be associated with a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g. wall posts, photo-sharing, on-line calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings.

Figure 11:
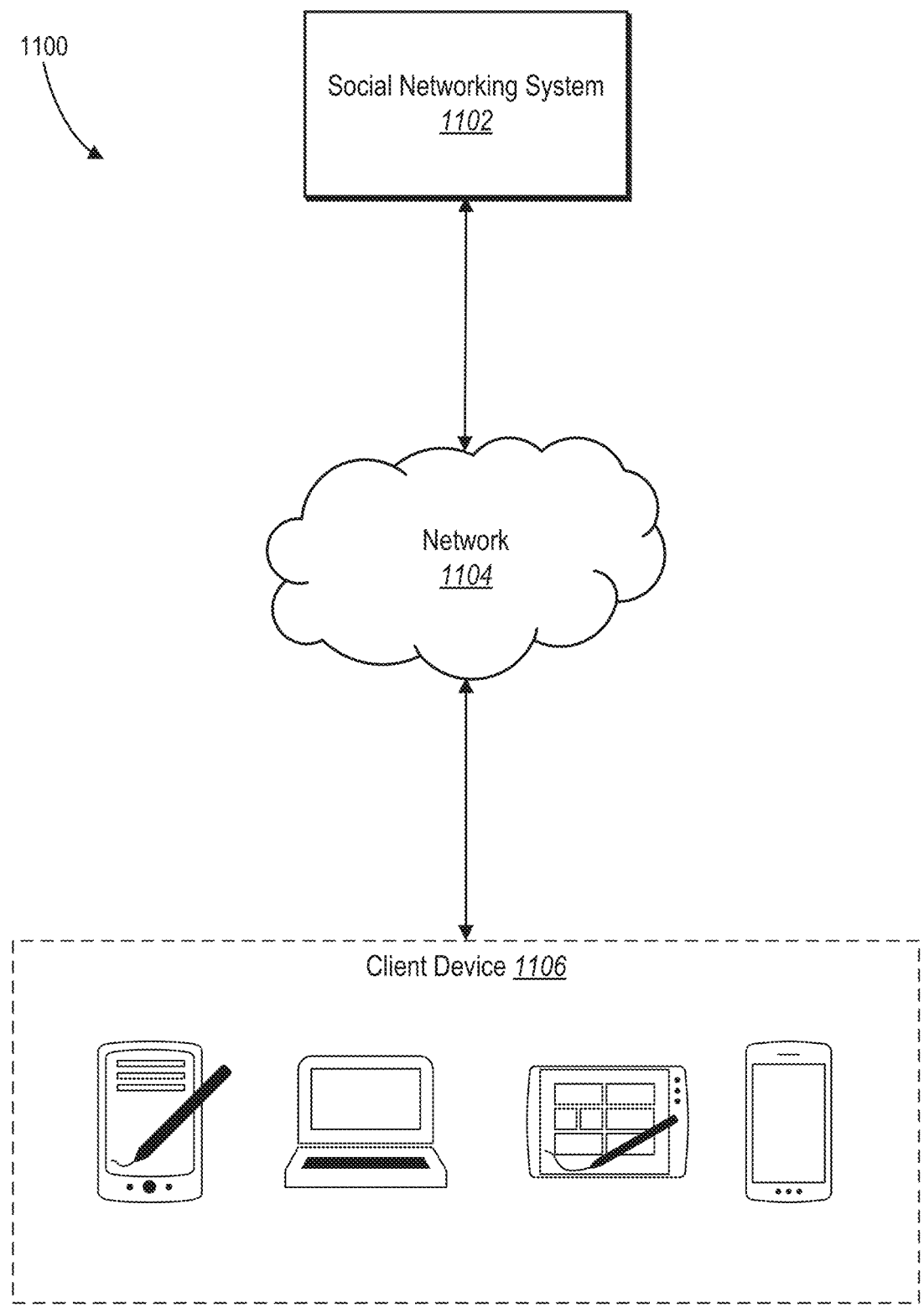
FIG. 11 illustrates an example network environment of a social networking system in accordance with one or more implementations.

FIG. 11 illustrates an example network environment 1100 of a networking system (e.g., social networking system 1102). Network environment 1100 includes a client system 1106 and a social networking system 1102 connected to each other by a network 1104. Although FIG. 11 illustrates a particular arrangement of client system 1106, social networking system 1102, and network 1104, this disclosure contemplates any suitable arrangement of client system 1106, social networking system 1102, and network 1104. As an example, and not by way of limitation, two or more of client system 1106 and social networking system 1102 may be connected to each other directly, bypassing network 1104. As another example, two or more of client system 1106 and social networking system 1102 may be physically or logically co-located with each other in whole or in part. Moreover, although FIG. 11 illustrates a particular number of client systems 1106, social networking systems 1102, and networks 1104, this disclosure contemplates any suitable number of client systems 1106, social networking systems 1102, and networks 1104. As an example, and not by way of limitation, network environment 1100 may include multiple client system 1106, social networking systems 1102, and networks 1104.

This disclosure contemplates any suitable network 1104. As an example, and not by way of limitation, one or more portions of network 1104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1104 may include one or more networks 1104.

Links may connect client system 1106 and social networking system 1102 to communication network 1104 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, client system 1106 may be an electronic device including hardware, software, or embedded logic components or a combination of two or more such components and capable of carrying out the appropriate functionalities implemented or supported by client system 1106. As an example, and not by way of limitation, a client system 1106 may include any of the computing devices discussed above in relation to FIG. 11. A client system 1106 may enable a network user at client system 1106 to access network 1104. A client system 1106 may enable its user to communicate with other users at other client systems 1106.

In particular embodiments, client system 1106 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1106 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client system 1106 one or more Hyper Text Markup Language (HTML) files responsive to the HTTP request. Client system 1106 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 1102 may be a network-addressable computing system that can host an online social network. Social networking system 1102 may generate, store, receive, and send social networking data, such as, for example, user-profile data, concept-profile data, social-graph information, or other suitable data related to the online social network. Social networking system 1102 may be accessed by the other components of network environment 1100 either directly or via network 1104. In particular embodiments, social networking system 1102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 1102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 1106, a social networking system 1102, or a third-party system to manage, retrieve, modify, add, or delete, the information stored in data store.

In particular embodiments, social networking system 1102 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 1102 may provide users of the online social network the ability to communicate and interact with other users. In particular embodiments, users may join the online social network via social networking system 1102 and then add connections (e.g., relationships) to a number of other users of social networking system 1102 whom they want to be connected to. Herein, the term "friend" may refer to any other user of social networking system 1102 with whom a user has formed a connection, association, or relationship via social networking system 1102.

In particular embodiments, social networking system 1102 may provide users with the ability to take actions on various types of items or objects, supported by social networking system 1102. As an example, and not by way of limitation, the items and objects may include groups or social networks to which users of social networking system 1102 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 1102 or by an external system of a third-party system, which is separate from social networking system 1102 and coupled to social networking system 1102 via a network 1104.

In particular embodiments, social networking system 1102 may be capable of linking a variety of entities. As an example, and not by way of limitation, social networking system 1102 may enable users to interact with each other as well as receive content from third-party systems or other entities, or to allow users to interact with these entities through an application programming interfaces (API) or other communication channels.

In particular embodiments, a third-party system may include one or more types of servers, one or more data stores, one or more interfaces, including but not limited to APIs, one or more web services, one or more content sources, one or more networks, or any other suitable components, e.g., that servers may communicate with. A third-party system may be operated by a different entity from an entity operating social networking system 1102. In particular embodiments, however, social networking system 1102 and third-party systems may operate in conjunction with each other to provide social networking services to users of social networking system 1102. In this sense, social networking system 1102 may provide a platform, or backbone, which other systems, such as third-party systems, may use to provide social networking services and functionality to users across the Internet.

In particular embodiments, a third-party system may include a third-party content object provider. A third-party content object provider may include one or more sources of content objects, which may be communicated to a client system 1106. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 1102 also includes user-generated content objects, which may enhance a user's interactions with social networking system 1102. User-generated content may include anything a user can add, upload, send, or "post" to social networking system 1102. As an example, and not by way of limitation, a user communicates posts to social networking system 1102 from a client system 1106. Posts may include data such as status updates or other textual data, location information, photos, videos, links, music or other similar data or media. Content may also be added to social networking system 1102 by a third-party through a "communication channel," such as a newsfeed or stream.

In particular embodiments, social networking system 1102 may include a variety of servers, sub-systems, programs, modules, logs, and data stores. In particular embodiments, social networking system 1102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 1102 may also include suitable components such as network interfaces, security mechanisms, load balancers, failover servers, management-and-network-operations consoles, other suitable components, or any suitable combination thereof. In particular embodiments, social networking system 1102 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example, and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 1102 to one or more client systems 1106 or one or more third-party system via network 1104. The web server may include a mail server or other messaging functionality for receiving and routing messages between social networking system 1102 and one or more client systems 1106. An API-request server may allow a third-party system to access information from social networking system 1102 by calling one or more APIs. An action logger may be used to receive communications from a web server about a user's actions on or off social networking system 1102. In conjunction with the action log, a third-party-content-object log may be maintained of user exposures to third-party-content objects. A notification controller may provide information regarding content objects to a client system 1106. Information may be pushed to a client system 1106 as notifications, or information may be pulled from client system 1106 responsive to a request received from client system 1106. Authorization servers may be used to enforce one or more privacy settings of the users of social networking system 1102. A privacy setting of a user determines how particular information associated with a user can be shared. The authorization server may allow users to opt in to or opt out of having their actions logged by social networking system 1102 or shared with other systems, such as, for example, by setting appropriate privacy settings. Third-party-content-object stores may be used to store content objects received from third parties, such as a third-party system. Location stores may be used for storing location information received from client systems 1106 associated with users. Advertisement-pricing modules may combine social information, the current time, location information, or other suitable information to provide relevant advertisements, in the form of notifications, to a user.

Figure 12:
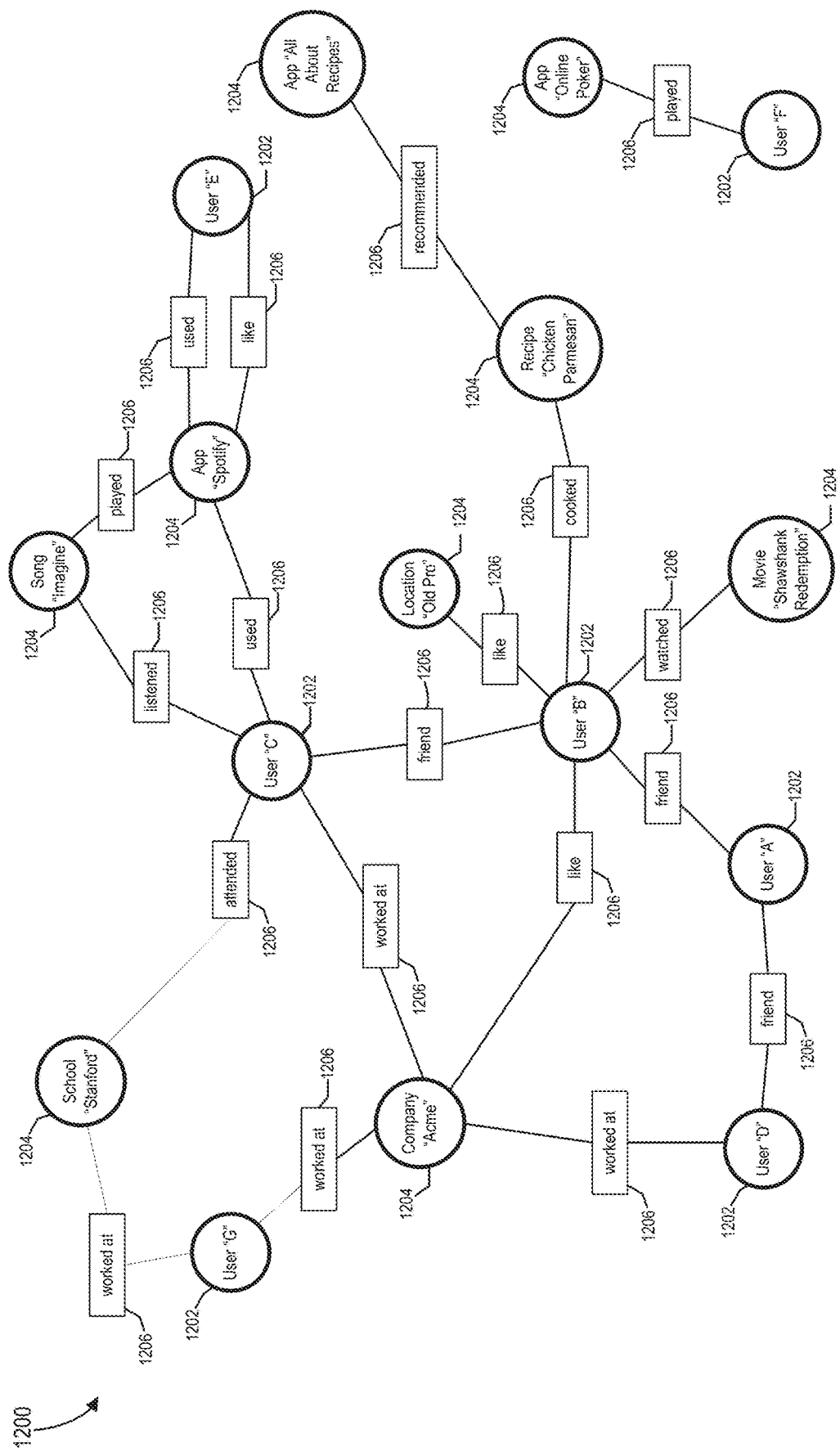
FIG. 12 illustrates an example social graph for a social networking system in accordance with one or more implementations.

FIG. 12 illustrates example social graph 1200. In particular embodiments, social networking system 1102 may store one or more social graphs 1200 in one or more data stores. In particular embodiments, social graph 1200 may include multiple nodes—which may include multiple user nodes 1202 or multiple concept nodes 1204—and multiple edges 1206 connecting the nodes. Example social graph 1200 illustrated in FIG. 12 is shown, for didactic purposes, in a two-dimensional visual map representation. In particular embodiments, a social networking system 1102, client system 1106, or third-party system may access social graph 1200 and related social-graph information for suitable applications. The nodes and edges of social graph 1200 may be stored as data objects, for example, in a data store (such as a social-graph database). Such a data store may include one or more searchable or query able indexes of nodes or edges of social graph 1200.

In particular embodiments, a user node 1202 may correspond to a user of social networking system 1102. As an example, and not by way of limitation, a user may be an individual (human user), an entity (e.g., an enterprise, business, or third-party application), or a group (e.g., of individuals or entities) that interacts or communicates with or over social networking system 1102. In particular embodiments, when a user registers for an account with social networking system 1102, social networking system 1102 may create a user node 1202 corresponding to the user, and store the user node 1202 in one or more data stores. Users and user nodes 1202 described herein may, where appropriate, refer to registered users and user nodes 1202 associated with registered users. In addition, or as an alternative, users and user nodes 1202 described herein may, where appropriate, refer to users that have not registered with social networking system 1102. In particular embodiments, a user node 1202 may be associated with information provided by a user or information gathered by various systems, including social networking system 1102. As an example, and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1204 may correspond to a concept. As an example and not by way of limitation, a concept may correspond to a place (such as, for example, a movie theater, restaurant, landmark, or city); a website (such as, for example, a website associated with social-network system 1102 or a third-party website associated with a web-application server); an entity (such as, for example, a person, business, group, sports team, or celebrity); a resource (such as, for example, an audio file, video file, digital photo, text file, structured document, or application) which may be located within social networking system 1102 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1204 may be associated with information of a concept provided by a user or information gathered by various systems, including social networking system 1102. As an example, and not by way of limitation, information of a concept may include a name or a title; one or more images (e.g., an image of the cover page of a book); a location (e.g., an address or a geographical location); a web site (which may be associated with a URL); contact information (e.g., a phone number or an email address); other suitable concept information; or any suitable combination of such information. In particular embodiments, a concept node 1204 may be associated with one or more data objects corresponding to information associated with concept node 1204. In particular embodiments, a concept node 1204 may correspond to one or more webpages.

In particular embodiments, a node in social graph 1200 may represent or be represented by a webpage (which may be referred to as a "profile page"). Profile pages may be hosted by or accessible to social networking system 1102. Profile pages may also be hosted on third-party websites associated with a third-party system. As an example, and not by way of limitation, a profile page corresponding to a particular external webpage may be the particular external webpage and the profile page may correspond to a particular concept node 1204. Profile pages may be viewable by all or a selected subset of other users. As an example, and not by way of limitation, a user node 1202 may have a corresponding user-profile page in which the corresponding user may add content, make declarations, or otherwise express himself or herself. As another example and not by way of limitation, a concept node 1204 may have a corresponding concept-profile page in which one or more users may add content, make declarations, or express themselves, particularly in relation to the concept corresponding to concept node 1204.

In particular embodiments, a concept node 1204 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example, and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1106 to send to social networking system 1102 a message indicating the user's action. In response to the message, social networking system 1102 may create an edge (e.g., an "eat" edge) between a user node 1202 corresponding to the user and a concept node 1204 corresponding to the third-party webpage or resource and store edge 1206 in one or more data stores.

In particular embodiments, a pair of nodes in social graph 1200 may be connected to each other by one or more edges 1206. An edge 1206 connecting a pair of nodes may represent a relationship between the pair of nodes. In particular embodiments, an edge 1206 may include or represent one or more data objects or attributes corresponding to the relationship between a pair of nodes. As an example, and not by way of limitation, a first user may indicate that a second user is a "friend" of the first user. In response to this indication, social networking system 1102 may send a "friend request" to the second user. If the second user confirms the "friend request," social networking system 1102 may create an edge

1206 connecting the first user's user node 1202 to the second user's user node 1202 in social graph 1200 and store edge 1206 as social-graph information in one or more of data stores. In the example of FIG. 12, social graph 1200 includes an edge 1206 indicating a friend relation between user nodes 1202 of user "A" and user "B" and an edge indicating a friend relation between user nodes 1202 of user "C" and user "B." Although this disclosure describes or illustrates particular edges 1206 with particular attributes connecting particular user nodes 1202, this disclosure contemplates any suitable edges 1206 with any suitable attributes connecting user nodes 1202. As an example, and not by way of limitation, an edge 1206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1200 by one or more edges 1206.

In particular embodiments, an edge 1206 between a user node 1202 and a concept node 1204 may represent a particular action or activity performed by a user associated with user node 1202 toward a concept associated with a concept node 1204. As an example, and not by way of limitation, as illustrated in FIG. 12, a user may "like," "attended," "played," "listened," "cooked," "worked at," or "watched" a concept, each of which may correspond to an edge type or subtype. A concept-profile page corresponding to a concept node 1204 may include, for example, a selectable "check in" icon (such as, for example, a clickable "check in" icon) or a selectable "add to favorites" icon. Similarly, after a user clicks these icons, social networking system 1102 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 1102 may create a "listened" edge 1206 and a "used" edge (as illustrated in FIG. 12) between user nodes 1202 corresponding to the user and concept nodes 1204 corresponding to the song and application to indicate that the user listened to the song and used the application. Moreover, social networking system 1102 may create a "played" edge 1206 (as illustrated in FIG. 12) between concept nodes 1204 corresponding to the song and the application to indicate that the particular song was played by the particular application. In this case, "played" edge 1206 corresponds to an action performed by an external application (SPOTIFY) on an external audio file (the song "Imagine"). Although this disclosure describes particular edges 1206 with particular attributes connecting user nodes 1202 and concept nodes 1204, this disclosure contemplates any suitable edges 1206 with any suitable attributes connecting user nodes 1202 and concept nodes 1204. Moreover, although this disclosure describes edges between a user node 1202 and a concept node 1204 representing a single relationship, this disclosure contemplates edges between a user node 1202 and a concept node 1204 representing one or more relationships. As an example, and not by way of limitation, an edge 1206 may represent both that a user likes and has used at a particular concept. Alternatively, another edge 1206 may represent each type of relationship (or multiples of a single relationship) between a user node 1202 and a concept node 1204 (as illustrated in FIG. 12 between user node 1202 for user "E" and concept node 1204 for "SPOTIFY").

In particular embodiments, social networking system 1102 may create an edge 1206 between a user node 1202 and a concept node 1204 in social graph 1200. As an example and not by way of limitation, a user viewing a concept-profile page (such as, for example, by using a web browser or a special-purpose application hosted by the user's client system 1106) may indicate that he or she likes the concept represented by the concept node 1204 by clicking or selecting a "Like" icon, which may cause the user's client system 1106 to send to social networking system 1102 a message indicating the user's liking of the concept associated with the concept-profile page. In response to the message, social networking system 1102 may create an edge 1206 between user node 1202 associated with the user and concept node 1204, as illustrated by "like" edge 1206 between the user and concept node 1204. In particular embodiments, social networking system 1102 may store an edge 1206 in one or more data stores. In particular embodiments, an edge 1206 may be automatically formed by social networking system 1102 in response to a particular user action. As an example, and not by way of limitation, if a first user uploads a picture, watches a movie, or listens to a song, an edge 1206 may be formed between user node 1202 corresponding to the first user and concept nodes 1204 corresponding to those concepts. Although this disclosure describes forming particular edges 1206 in particular manners, this disclosure contemplates forming any suitable edges 1206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social networking system 1102). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example, and not by way of limitation, advertisements may be included among the search results of a search-results page, where sponsored content is promoted over non-sponsored content.

In particular embodiments, an advertisement may be requested for display within social networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 1102 may execute or modify a particular action of the user.

An advertisement may also include social networking-system functionality that a user may interact with. As an example, and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 1102) or RSVP (e.g., through social networking system 1102) to an event associated with the advertisement. In addition, or as an alternative, an advertisement may include social networking-system context directed to the user. As an example, and not by way of limitation, an advertisement may display information about a friend of the user within social networking system 1102 who has taken an action associated with the subject matter of the advertisement.

In particular embodiments, social networking system 1102 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 1102 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 1102 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example, and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 90% of the overall coefficient, while the relationship between the user and the object may comprise 40% of the overall coefficient. In particular embodiments, the social networking system 1102 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example, and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 1102 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 1102 may calculate a coefficient based on a user's actions. Social networking system 1102 may monitor such actions on the online social network, on a third-party system, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 1102 may calculate a coefficient based on the user's actions with particular types of content. The content may be associated with the online social network, a third-party system, or another suitable system. The content may include users, profile pages, posts, news stories, headlines, instant messages, chat room conversations, emails, advertisements, pictures, video, music, other suitable objects, or any combination thereof. Social networking system 1102 may analyze a user's actions to determine whether one or more of the actions indicate an affinity for subject matter, content, other users, and so forth. As an example, and not by way of limitation, if a user may make frequently posts content related to "coffee" or variants thereof, social networking system 1102 may determine the user has a high coefficient with respect to the concept "coffee". Particular actions or types of actions may be assigned a higher weight and/or rating than other actions, which may affect the overall calculated coefficient. As an example, and not by way of limitation, if a first user emails a second user, the weight or the rating for the action may be higher than if the first user simply views the user-profile page for the second user.

In particular embodiments, social networking system 1102 may calculate a coefficient based on the type of relationship between particular objects. Referencing the social graph 1200, social networking system 1102 may analyze the number and/or type of edges 1206 connecting particular user nodes 1202 and concept nodes 1204 when calculating a coefficient. As an example, and not by way of limitation, user nodes 1202 that are connected by a spouse-type edge (representing that the two users are married) may be assigned a higher coefficient than user nodes 1202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example, and not by way of limitation, if a user is tagged in first photo, but merely likes a second photo, social networking system 1102 may determine that the user has a higher coefficient with respect to the first photo than the second photo because having a tagged-in-type relationship with content may be assigned a higher weight and/or rating than having a like-type relationship with content. In particular embodiments, social networking system 1102 may calculate a coefficient for a first user based on the relationship one or more second users have with a particular object. In other words, the connections and coefficients other users have with an object may affect the first user's coefficient for the object. As an example, and not by way of limitation, if a first user is connected to or has a high coefficient for one or more second users, and those second users are connected to or have a high coefficient for a particular object, social networking system 1102 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1200. As an example, and not by way of limitation, social-graph entities that are closer in the social graph 1200 (i.e., fewer degrees of separation) may have a higher coefficient than entities that are further apart in the social graph 1200.

In particular embodiments, social networking system 1102 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 1106 of the user). A first user may be more interested in other users or concepts that are closer to the first user. As an example, and not by way of limitation, if a user is one mile from an airport and two miles from a gas station, social networking system 1102 may determine that the user has a higher coefficient for the airport than the gas station based on the proximity of the airport to the user.

In particular embodiments, social networking system 1102 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 1102 may provide information that is relevant to user's interests and current circumstances, increasing the likelihood that they will find such information of interest. In particular embodiments, social networking system 1102 may generate content based on coefficient information. Content objects may be provided or selected based on coefficients specific to a user. As an example, and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 1102 may generate search results based on coefficient information. Search results for a particular user may be scored or ranked based on the coefficient associated with the search results with respect to the querying user. As an example, and not by way of limitation, search results corresponding to objects with higher coefficients may be ranked higher on a search-results page than results corresponding to objects having lower coefficients.

In particular embodiments, social networking system 1102 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system (e.g., via an API or other communication channel), or from another suitable system. In response to the request, social networking system 1102 may calculate the coefficient (or access the coefficient information if it has previously been calculated and stored). In particular embodiments, social networking system 1102 may measure an affinity with respect to a particular process. Different processes (both internal and external to the online social network) may request a coefficient for a particular object or set of objects. Social networking system 1102 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/978,027, filed 22 Dec. 2010, U.S. patent application Ser. No. 12/978,265, filed 23 Dec. 2010, and U.S. patent application Ser. No. 13/642,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example, and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example, and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example, and not by way of limitation, a particular concept node 1204 corresponding to a particular photo may have a privacy setting specifying that the photo may only be accessed by users tagged in the photo and their friends. In particular embodiments, privacy settings may allow users to opt in or opt out of having their actions logged by social networking system 1102 or shared with other systems (e.g., third-party system). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 1102 may send a request to the data store for the object. The request may identify the user associated with the request and may only be sent to the user (or a client system 1106 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
receiving a makeup selection to apply to an area of an identified face in a digital video stream, the makeup selection comprising an albedo color in an RGB color space and a material including a texture characteristic, wherein the albedo color of the makeup selection comprises a base color of a selected makeup product in the RGB color space;
extracting luminance frequencies from the digital video stream;
blending, in the RGB color space, the albedo color of the makeup selection with the luminance frequencies of the digital video stream;
converting the blended color of the makeup selection to a LAB color space;
modifying, in the LAB color space, a lightness of the blended color by applying at least one shading model based on the texture characteristic of the material corresponding to the makeup selection; and
presenting, via a display screen of a client device, the makeup selection comprising the blended color with the modified lightness on the area of the identified face in the digital video stream.

2. The computer-implemented method as recited in claim 1, further comprising converting the blended color with the modified lightness from the LAB color space to the RGB color space prior to presenting the makeup selection via the display screen of the client device.

3. The computer-implemented method as recited in claim 1, wherein extracting the luminance frequencies from the digital video stream comprises:
normalizing luminance values of the digital video stream; and
extracting, from the normalized luminance values, a set of mid-range frequencies and a set of low-range frequencies from a desaturated digital image frame of the digital video stream.

4. The computer-implemented method as recited in claim 3, wherein blending the albedo color of the makeup selection with the luminance frequencies comprises:
blending the albedo color of the makeup selection with the set of mid-range frequencies by utilizing a linear interpolation function to screen the mid-range frequencies over the albedo color of the makeup selection to generate a first blend output; and
blending the first blend output with the set of low-range frequencies by multiplying the low-range frequencies on top of the first blend output to generate a second blend output.

5. The computer-implemented method as recited in claim 4, wherein converting the blended color of the makeup selection to the LAB color space comprises converting the second blend output to the LAB color space.

6. The computer-implemented method as recited in claim 1, wherein presenting the makeup selection comprising the blended color with the modified lightness on the area of the identified face in the digital video stream comprises:
generating a three-dimensional mesh corresponding to the identified face; and
presenting the makeup selection on an area of the three-dimensional mesh corresponding to the area of the identified face.

7. The computer-implemented method as recited in claim 1, further comprising:
receiving an accessory selection to attach an accessory to a second area of the identified face;
adding, in response to the accessory selection, an accessory mesh to a three-dimensional mesh corresponding to the identified face;
applying an accessory texture comprising the accessory to the accessory mesh; and
presenting, via the display screen of the client device, the accessory on the second area of the identified face in the digital video stream.

8. The computer-implemented method as recited in claim 7, further comprising:
generating, in response to adding the accessory mesh to the three-dimensional mesh corresponding to the identified face, an animation armature comprising a plurality of joints for the accessory mesh; and
animating the accessory mesh using the animation armature in response to movement of the second area of the identified face in the digital video stream.

9. The computer-implemented method as recited in claim 1, further comprising:
generating a guiding image based on a luma of the digital video stream; and
smoothing, using a fast guided blur filter, the identified face based on the guiding image.

10. The computer-implemented method as recited in claim 1, further comprising:
dividing the digital video stream into a plurality of sections;
determining, for a section of the plurality of sections, an average log luma and a luma range; and
shifting, for the section of the plurality of sections, the average log luma based on a predetermined luma threshold to apply localized tone mapping to the digital video stream.

11. A non-transitory computer readable storage medium comprising instructions that, when executed by at least one processor, cause a computer system to:
receive a makeup selection to apply to an area of an identified face in a digital video stream, the makeup selection comprising an albedo color in an RGB color space and a material including a texture characteristic, wherein the albedo color of the makeup selection comprises a base color of a selected makeup product in the RGB color space;
extract luminance frequencies from the digital video stream;
blend, in the RGB color space, the albedo color of the makeup selection with the luminance frequencies of the digital video stream;
convert the blended color of the makeup selection into a LAB color space;
modify, in the LAB color space, a lightness of the blended color by applying at least one shading model based on the texture characteristic of the material corresponding to the makeup selection; and
present, via a display screen of a client device, the makeup selection comprising the blended color with the modified lightness on the area of the identified face in the digital video stream.

12. The non-transitory computer readable storage medium as recited in claim 11, wherein the instructions further cause the computer system to:
- extract a set of mid-range frequencies and a set of low-range frequencies from a desaturated digital image frame of the digital video stream;
- blend the albedo color of the makeup selection with the set of mid-range frequencies by utilizing a linear interpolation function to screen the mid-range frequencies over the albedo color of the makeup selection to generate a first blend output; and
- blend the first blend output with the set of low-range frequencies by multiplying the low-range frequencies on top of the first blend output to generate a second blend output.

13. The non-transitory computer readable storage medium as recited in claim 11, further comprising instructions that, when executed by the at least one processor, cause the computer system to:
- receive an accessory selection to attach an accessory to a second area of the identified face;
- add, in response to the accessory selection, an accessory mesh to a three-dimensional mesh corresponding to the identified face;
- apply an accessory texture comprising the accessory to the accessory mesh; and
- present, via the display screen of the client device, the accessory on the second area of the identified face in the digital video stream.

14. The non-transitory computer readable storage medium as recited in claim 13, further comprising instructions that, when executed by the at least one processor, cause the computer system to:
- generate, in response to adding the accessory mesh to the three-dimensional mesh corresponding to the identified face, an animation armature comprising a plurality of joints for the accessory mesh; and
- animate the accessory mesh using the animation armature in response to movement of the second area of the identified face in the digital video stream.

15. The non-transitory computer readable storage medium as recited in claim 11, further comprising instructions that, when executed by the at least one processor, cause the computer system to:
- generate a guiding image based on a luma of the digital video stream; and
- smooth, using a fast guided blur filter, the identified face based on the guiding image.

16. The non-transitory computer readable storage medium as recited in claim 11, further comprising instructions that, when executed by the at least one processor, cause the computer system to:
- divide the digital video stream into a plurality of sections;
- determine, for a section of the plurality of sections, an average log luma and a luma range; and
- shift, for the section of the plurality of sections, the average log luma based on a predetermined luma threshold to apply localized tone mapping to the digital video stream.

17. The non-transitory computer readable storage medium as recited in claim 11, further comprising instructions that, when executed by the at least one processor, cause the computer system to:
- generating a downsampled version of the digital video stream; and
- utilizing the downsampled version of the digital video stream to smooth the identified face and to apply localized tone mapping to the digital video stream.

18. A system comprising:
- at least one processor; and
- a non-transitory computer readable storage medium comprising instructions that, when executed by the at least one processor, cause the system to:
  - receive a makeup selection to apply to an area of an identified face in a digital video stream, the makeup selection comprising an albedo color in an RGB color space and a material including a texture characteristic, wherein the albedo color of the makeup selection comprises a base color of a selected makeup product in the RGB space;
  - extract luminance frequencies from the digital video stream;
  - blend, in the RGB color space, the albedo color of the makeup selection with the luminance frequencies of the digital video stream;
  - convert the blended color of the makeup selection into a LAB color space;
  - modify, in the LAB color space, a lightness of the blended color by applying at least one shading model based on the texture characteristic of the material corresponding to the makeup selection; and
  - present, via a display screen of a client device, the makeup selection comprising the blended color with the modified lightness on the area of the identified face in the digital video stream.

19. The system as recited in claim 18, wherein the instructions further cause the system to:
- extract a set of mid-range frequencies and a set of low-range frequencies from a desaturated digital image frame of the digital video stream;
- blend the albedo color of the makeup selection with the set of mid-range frequencies by utilizing a linear interpolation function to screen the mid-range frequencies over the albedo color to generate a first blend output; and
- blend the first blend output with the set of low-range frequencies by multiplying the low-range frequencies on top of the first blend output to generate a second blend output.

20. The system as recited in claim 18, further comprising instructions that cause the system to:
- smooth, using a fast guided filter, the identified face using a guiding image based on a luma of the digital video stream; and
- shift an average log luma of a plurality of sections of the digital video stream based on a predetermined luma threshold to apply localized tone mapping to the digital video stream.

* * * * *